(12) United States Patent
Bonham

(10) Patent No.: US 12,547,012 B2
(45) Date of Patent: Feb. 10, 2026

(54) GUIDANCE SYSTEM FOR OPTICAL INSTRUMENTS

(71) Applicant: 7SPEER ENGINEERING, LLC, Tempe, AZ (US)

(72) Inventor: Alex Bonham, Tempe, AZ (US)

(73) Assignee: 7SPEER ENGINEERING, LLC, Tempe, AZ (US)

( * ) Notice: Subject to any disclaimer, the term of this patent is extended or adjusted under 35 U.S.C. 154(b) by 96 days.

(21) Appl. No.: 18/523,784

(22) Filed: Nov. 29, 2023

(65) Prior Publication Data

US 2025/0172819 A1    May 29, 2025

(51) Int. Cl.
| | |
|---|---|
| *G02B 27/40* | (2006.01) |
| *F41G 1/17* | (2006.01) |
| *F41G 1/46* | (2006.01) |
| *F41G 11/00* | (2006.01) |
| *G02B 27/02* | (2006.01) |

(52) U.S. Cl.
CPC ............... *G02B 27/40* (2013.01); *F41G 1/17* (2013.01); *F41G 1/46* (2013.01); *F41G 11/001* (2013.01); *G02B 27/022* (2013.01)

(58) Field of Classification Search
CPC ......... G02B 27/40; G02B 27/022; F41G 1/17; F41G 1/46; F41G 11/001
See application file for complete search history.

(56) References Cited

U.S. PATENT DOCUMENTS

| | | | |
|---|---|---|---|
| 6,978,569 B2 | 12/2005 | Williamson, IV et al. | |
| 11,163,416 B2 | 11/2021 | Powderly et al. | |
| 11,402,175 B2 | 8/2022 | York et al. | |
| 2003/0115215 A1 | 6/2003 | Swarovski | |
| 2019/0011818 A1* | 1/2019 | Chien .................... | F21S 10/02 |
| 2020/0263956 A1 | 8/2020 | Allgaier | |
| 2022/0196363 A1 | 6/2022 | Allgaier et al. | |
| 2024/0161353 A1* | 5/2024 | Lyren ...................... | F41G 3/12 |

FOREIGN PATENT DOCUMENTS

| | | | | |
|---|---|---|---|---|
| CA | 2458930 C | * | 7/2010 | ............... F41G 1/44 |
| CN | 102215732 A | * | 10/2011 | ......... A61B 1/00186 |
| EP | 2749836 A2 | * | 7/2014 | ............... F41G 1/38 |
| WO | 2015180307 A1 | | 12/2015 | |
| WO | WO-2024044712 A1 | * | 2/2024 | ............. F41G 1/345 |
| WO | WO-2024050348 A1 | * | 3/2024 | ............... F41G 1/14 |

* cited by examiner

*Primary Examiner* — Tuyen K Vo
(74) *Attorney, Agent, or Firm* — McCoy Russell LLP

(57) ABSTRACT

A guidance system mountable to an optical instrument includes an electronic output indicator (EOI) array, the EOI array positioned at a perimeter of an eyepiece of the optical instrument upon mounting the guidance system to the optical instrument, and a controller. While the guidance system is mounted to the optical instrument, the controller includes executable instructions stored in non-transitory memory thereon to, execute a plurality of operating modes, including, for each operating mode, dividing the EOI array into a different plurality of EOI subarrays, and modulating the state of each of the EOI subarrays responsive to a different set of one or more sensor signals.

20 Claims, 11 Drawing Sheets

GUIDANCE SYSTEM FOR OPTICAL INSTRUMENTS

TECHNICAL FIELD

The present description relates to a guidance system for optical instruments.

BACKGROUND AND SUMMARY

Optical instruments are devices that assist in precise visual alignment (e.g., aiming) of ranged weapons, surveying instruments, aircraft equipment or optical illumination equipment with an intended target. One example of an optical instrument includes a sighting device or an optical scope. Existing systems for enhancing precision and accuracy of optical instruments are designed to serve individual optical instruments for a particular application. Examples of such tools include range-finding binoculars, tilt indicators for firearm scopes, and target-finding tools for hunting devices. For example, York et al. (U.S. Pat. No. 11,402,175 B2) describes an optical scope for a shooting device that provides an indication of whether the optical system is canted. Similarly, Willliamson, I V et al. (U.S. Pat. No. 6,978,569) describes a tilt indicator for use on a firearm that includes a signal to indicate if the firearm is level or out of level.

However, the inventors herein have recognized potential issues with such systems. In particular, these existing systems are permanently integrated or built-into an optical instrument, and are designed to be utilized for one particular optical instrument, as well as for one specific application. For example, the systems of York and Williamson are not adaptable for use across different optical instruments such as for scopes of different firearms including bows, rifles, and shotguns, or for use over a broad range of different applications or operating modes such as hunting, competitive target shooting, birding, and photography. Thus, procuring of additional tools is required for each specific type of optical instrument and application, which is costly and cumbersome.

To overcome at least some of the aforementioned drawbacks, a guidance system mountable to an optical instrument includes an electronic output indicator (EOI) array and a controller. The EOI array is positioned at a perimeter of an eyepiece of the optical instrument upon mounting the guidance system to the optical instrument. The controller includes executable instructions stored in non-transitory memory thereon to execute a plurality of operating modes while the guidance system is mounted to the optical instrument, including, for each operating mode, dividing the EOI array into a different plurality of EOI subarrays, and modulating the state of each of the EOI subarrays responsive to a different set of one or more sensor signals.

As such, the guidance system possess inherent advantages relative to existing systems. First, the guidance system may flexibly execute and switch between a plurality of different operating modes while the guidance system is mounted to the same optical instrument, and may thereby be adapted for a broad range of applications. Second, performance data for each of the plurality of operating modes maybe stored, retrieved, and displayed at the guidance system. Third, each of the plurality of operating modes may be executed without detaching the guidance system from the optical instrument. Fourth, while executing each of the plurality of operating modes, the guidance system is only peripherally visible to the operator while looking through the eyepiece of the optical instrument and the guidance system is operated without obstructing a field of view of the eyepiece.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 14 shows a flow chart for an example method of operating the guidance system for an optical instrument of FIG. 1.

DETAILED DESCRIPTION

Figure 1:
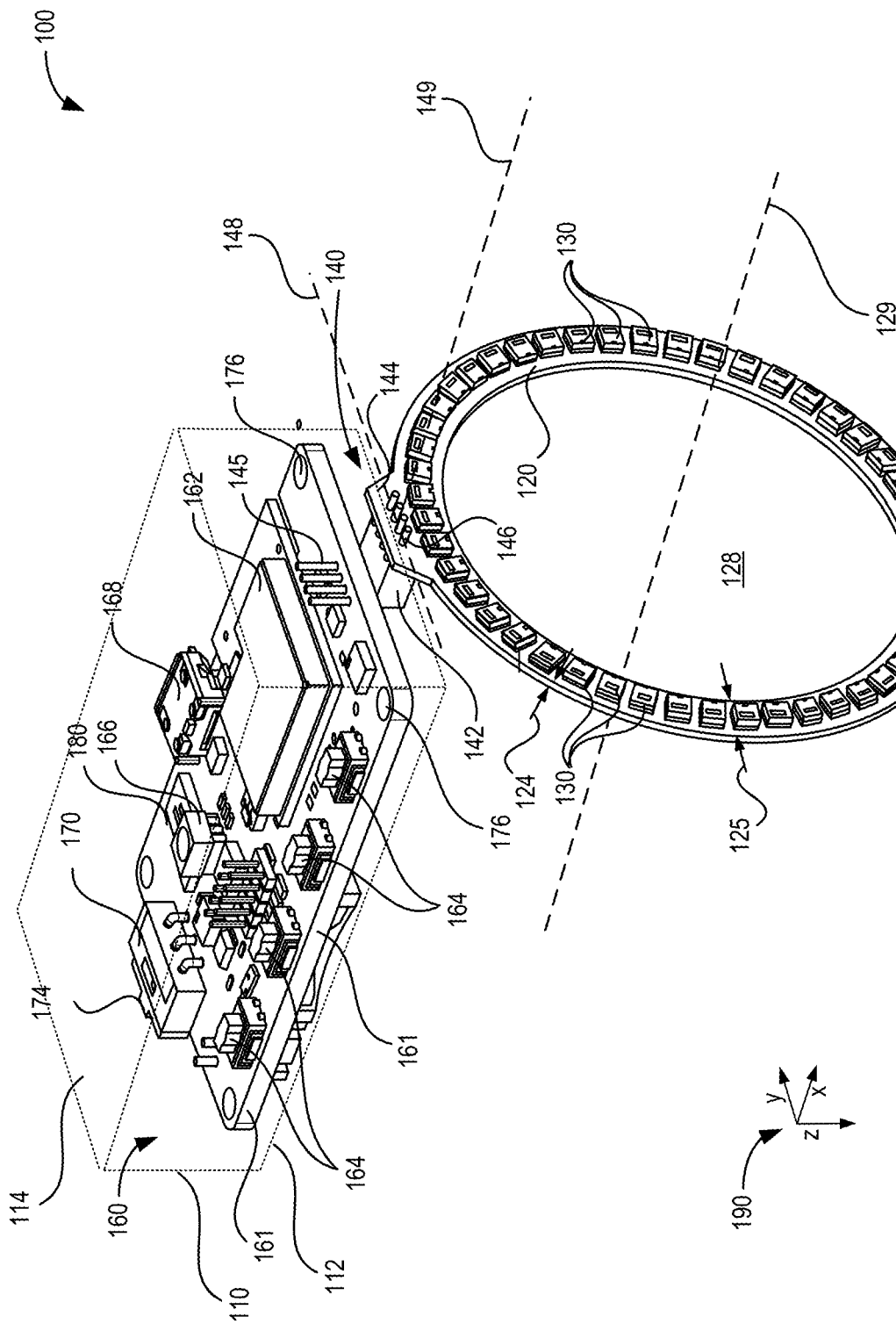
FIG. 1 shows a perspective view of an example guidance system for an optical instrument.
Figure 2:
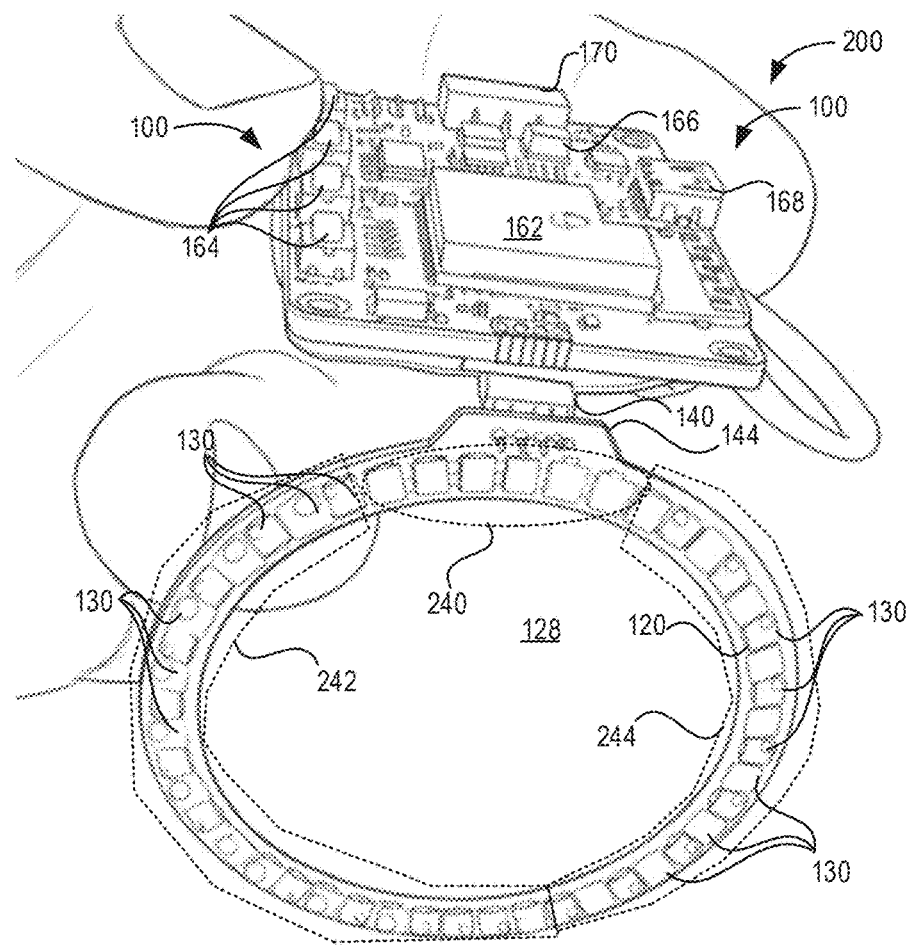
FIG. 2 shows a photograph of a perspective view of the guidance system for an optical instrument of FIG. 1.
Figure 3:
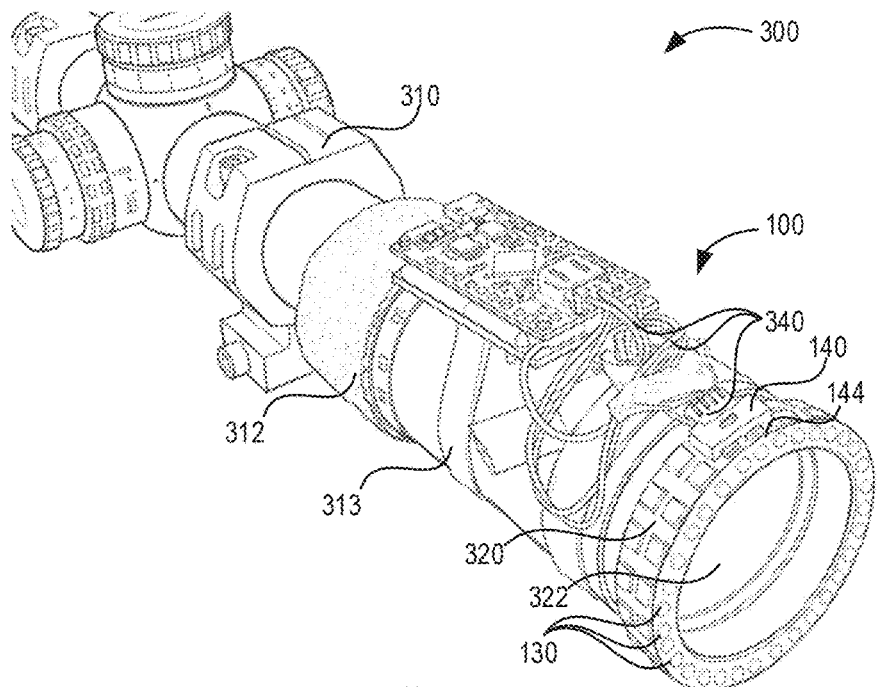
FIG. 3 shows a photograph of the guidance system of FIGS. 1 and 2 mounted to an optical instrument.
Figure 4:
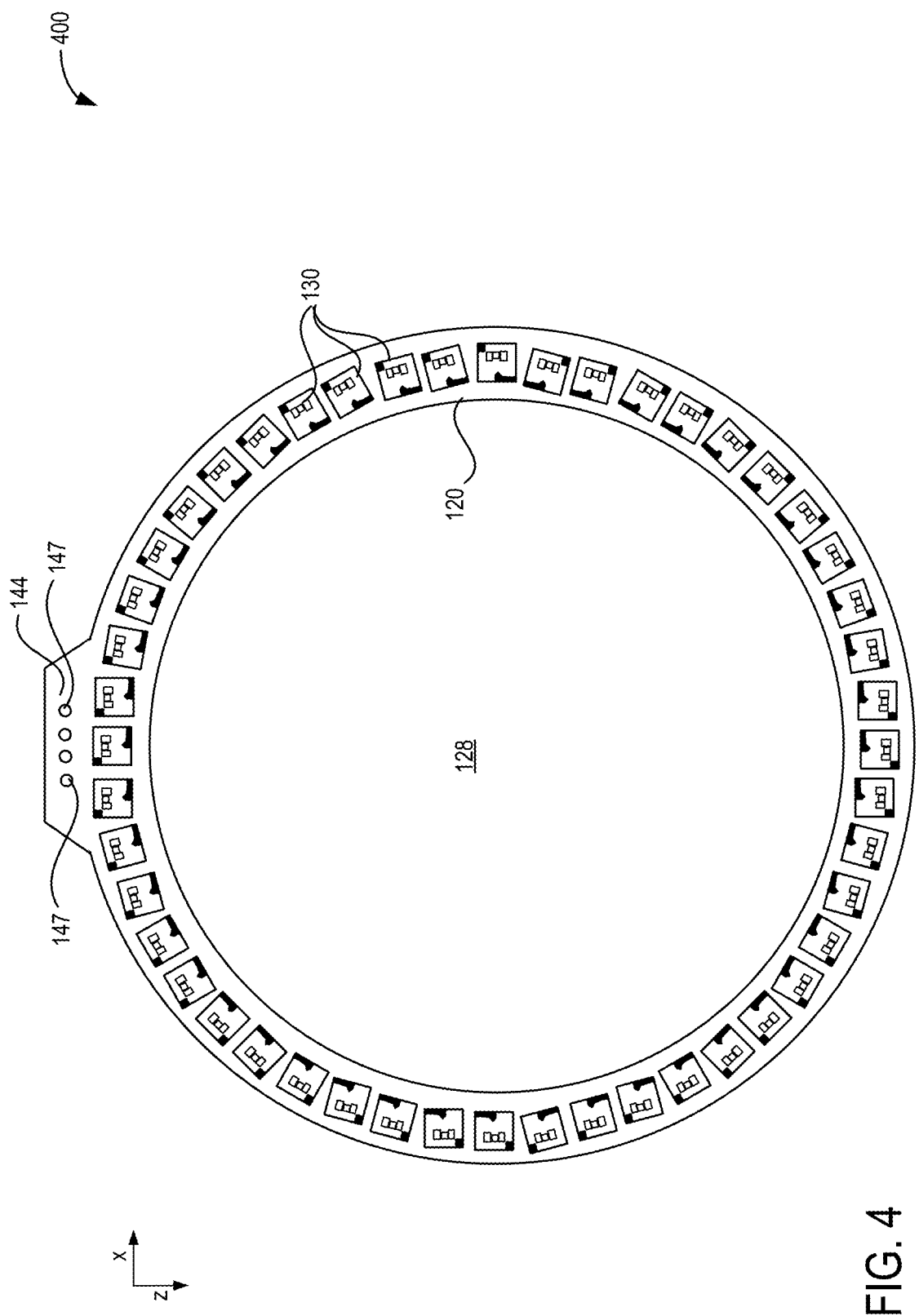
FIG. 4 shows a frontal view of an example support frame with an array of electronic output indicators of the guidance system of FIG. 1.
Figure 5:
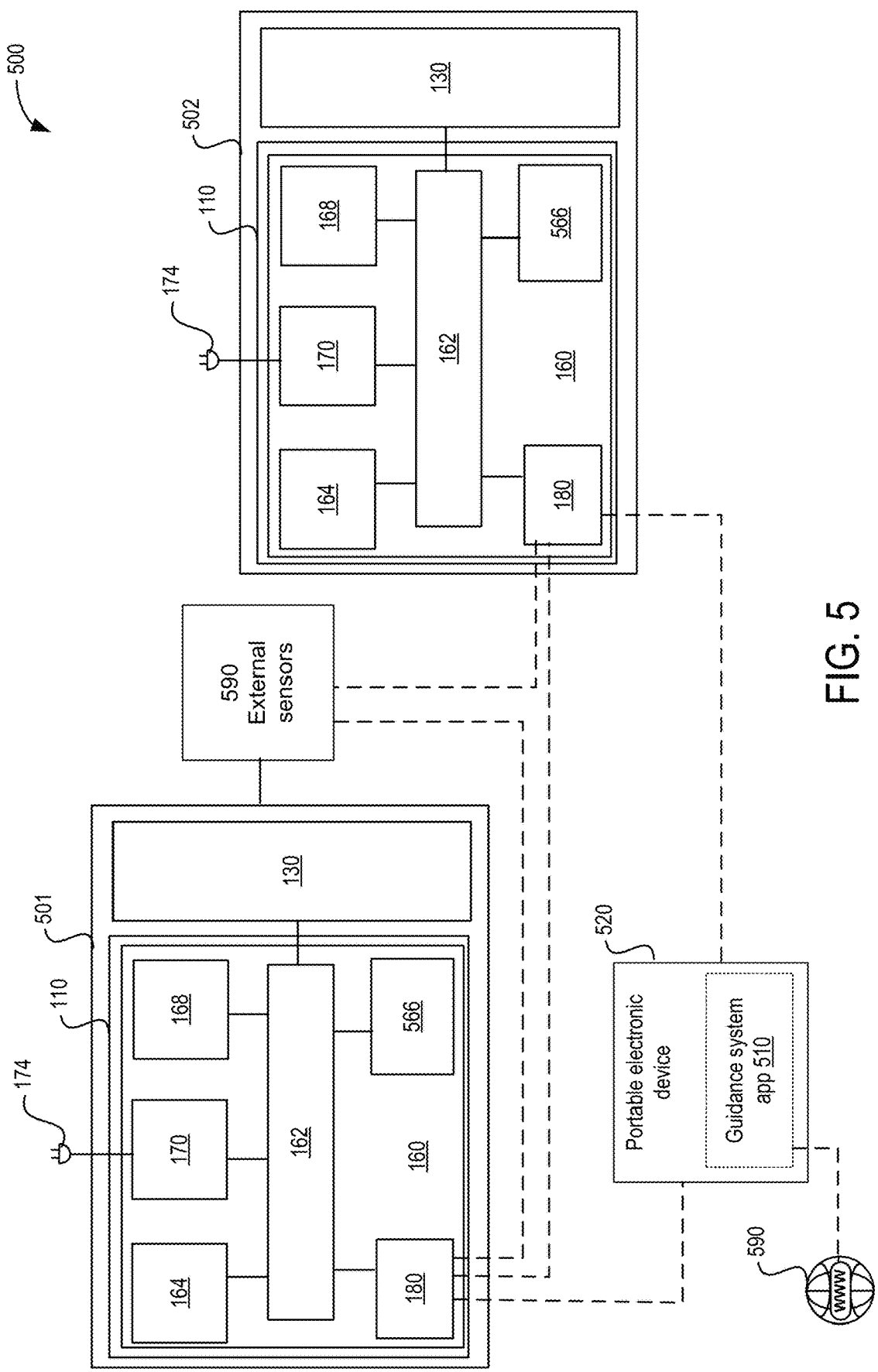
FIG. 5 shows an exemplary block schematic showing communication between of a plurality of the guidance systems of FIG. 1.

A guidance system for an optical instrument, including an array of electronic output indicators, is described herein and depicted schematically and through photographs in FIGS. 1-3. The array of electronic output indicators may be positioned on a support frame, and may be divided into a plurality of subarrays, corresponding to various operating modes selected for the guidance system, as depicted schematically in FIGS. 4, 6, 7, 10, and 12. In one example, a plurality of guidance systems, each mounted to a respective optical instrument, are communicatively coupled to each other, as shown in FIG. 5. During operation, the guidance system stores and records performance data, and the guidance system can display the performance data in real-time or from history, as shown in FIGS. 8, 9A, 9B, and 13. FIG. 14 illustrates a method of operating the guidance system for an optical instrument.

It is to be understood that the specific assemblies and systems illustrated in the attached drawings, and described in the following written specification are exemplary embodiments of the inventive concepts defined herein. For purposes of discussion, the drawings are described collectively. Thus, like elements may be commonly referred to herein with like reference numerals and may not be re-introduced.

FIGS. 1, 6, 7, 10, and 12 show schematics of example configurations with approximate positioning of the various components, and are shown approximately to scale. However, it is to be appreciated that FIGS. 1, 6, 7, 10, and 12 may be used to represent other relative dimensions.

Turning to FIGS. 1-4, they illustrate a guidance system 100, including a housing 110 (depicted by dotted box), an array of electronic output indicators (EOIs) 130, and an electronic module 160 included within the housing. In the example of FIG. 1, the array of EOIs (herein also referred to as the EOI array) are mounted on a support frame 120, and the support frame is coupled to one end of the housing 110 by way of a coupling 140. Housing 110 includes a mountable surface 112 for fixedly mounting the housing 110 to an optical instrument. In particular, mounting the housing 110 mounted fixedly to the optical instrument facilitates positioning the array of EOIs at a perimeter of an eyepiece of the optical instrument, as further described in detail herein. Furthermore when the housing 110 is fixedly mounted to the optical instrument, a position of the guidance system 100, including the housing 110 and the array of EOIs 130 may be fixed, relative to the optical instrument. As described herein, an EOI assembly refers to the support frame 120 taken together with the array of EOIs 130.

A generic depiction of housing 110, represented by a dotted box is shown in FIG. 1. As shown in reference to rectangular coordinate axes 190, the housing 110 may extend lengthwise in the x-direction, widthwise in the y-direction, and depthwise in the z-direction. Housing 110 serves to house the components of the electronic module 160. As such, housing 110 physically includes, and provides physical and environmental protection (e.g., shielding from dust, moisture, electricity, temperature) for the components of the electronic module 160. A shape and volume of housing 110 may be large enough to accommodate the electronic module 160. A top surface 114 of the housing 110 may be removable to provide access to the electronic module 160 for maintenance and the like. Although the top surface 114 may be removable, refastening the top surface 114 to the housing 110 reseals the housing 110 to maintain the physical and environmental protection of the electronic module 160. The walls and surfaces housing 110 may further be constructed of a rigid material such as hard plastic, metal, and the like, in order to provide the structural rigidity. Furthermore, the housing 110 may include an electrically non-conductive material to increase thermal and electrical insulation of the electronic module 160 from the environment external to the housing 110.

As mentioned above, housing 110 further includes a mountable surface 112 for fixedly mounting the housing 110 to an optical instrument. In one embodiment, the mountable surface 112 is integrated into a bottom surface (e.g., the surface of the housing positioned toward the positive z-direction, with reference to coordinate axis 190) of the housing 110. The mountable surface 112 may be constructed to mate directly to an opposing mountable surface on the optical instrument. As a simple example, in the case where the housing 110 is to be mounted to a convex surface on the optical instrument, the mountable surface 112 may include a concave surface (e.g., where the concavity of the concave surface matches the convexity of the convex surface) so as to mate directly and fit closely (e.g., in face-sharing contact) with the convex surface of the optical instrument. In another example, in the case where the housing 110 is to be mounted to a flat surface on the optical instrument, a mountable surface 112 may include a flat surface so as to mate directly and fit closely with the flat surface of the optical instrument. In a further example, where the opposing mountable surface on the optical instrument includes one or more cavities and protrusions (e.g., including one or more concavities and convexities), the mountable surface may include matching and opposing protrusions and cavities, respectively (e.g., including one or more convexities and concavities, respectively) so that the mountable surface 112 may mate directly to the opposing mountable surface on the optical instrument. In the case where the mountable surface 112 and the opposing mountable surface on the optical instrument include a plurality of opposing cavities and protrusions (e.g., including one or more concavities and convexities) a mounting of the housing at the optical instrument may be stronger, such that the guidance system 100 may be more strongly fixed relative to the optical instrument during their operation.

In some cases a cross-sectional area of the mountable surface 112 may match a cross-sectional area of the opposing mountable surface on the optical instrument so that a firm and rigid mounted connection is made across the entirety of the matched cross-sectional area when the mountable surface 112 is mounted to the optical instrument. In one example, the matched cross-sectional area may be greater than a threshold cross-sectional area to ensure that the housing 110 is fixed relative to the optical instrument when housing 110 is mounted thereto. In some examples, a threshold cross-sectional area may be decreased commensurate with advantageously reducing a size and bulkiness of the housing.

In another embodiment, the mountable surface 112 may include a detachable mounting surface that is not integrated with a bottom surface of the housing 110, but that is detachably mountable to a bottom surface of the housing 110. The detachable mounting surface may include fasteners for rigidly and fixedly mounting the detachable mounting surface to the bottom surface of the housing 110. Fasteners may include one or more of screws, rivets, clips, hook-and-loop fasteners, straps, adhesive, tape, glue, and the like. Reusable detachable fasteners may be advantageous for detaching and swapping out the detachable mountable surface. Furthermore, the bottom surface of the housing 110 may include a flat surface, so as to simplify construction of the housing 110 and to facilitate mounting of the detachable mounting surface thereto.

The guidance system 100 may include a plurality of detachable mounting surfaces that are each compatible with the housing 110. In this way each of the plurality of detachable mounting surfaces can be selected and swapped out with another of the plurality of detachable mounting surfaces, to facilitate mounting the housing 110 to different types of optical instruments in different guidance system applications, as desired by the operator. In this way, the (detachable) mounting surface 112 may be a modular component of housing 110, so that the housing 110 may be easily adapted and flexible to be able to be fixedly mountable to a broad range of optical instruments by selecting the suitable detachable mounting surface. Furthermore, various detachable mounting surfaces may be fabricated and customized to mount and fit to a desired optical instrument. For example, housing 110 may include a plurality of detachable mounting surfaces that are designed and customized for mounting to optical scopes for various sorts of firearms. These various firearms may include different types of rifles, shotguns, pistols, handguns, and the like, as well as other types of firearms, such as bows (e.g., compound bows, longbows, and the like). A type and size of optical scope may depend on the firearm type and application; hence, the detachable mountable surface of the housing 110 may be selected to match and mount to different types and sizes of optical scopes. Housing 110 may further include a plurality of detachable mounting surfaces that are designed and customized for mounting to optical instruments for long-range observation and magnification viewing such as binoculars, and telescopes. Housing 110 may further include a plurality of detachable mounting surfaces that are designed and customized for mounting to optical instruments in photography applications such as cameras (digital, video, film, SLR, and the like).

In another embodiment, the mountable surface 112 may include a compressible layer that contacts and is interposed between the bottom surface of the housing 110 and the optical instrument when the housing 110 is mounted to the optical instrument. The compressible layer may be composed of a material that is rubbery, high-friction, and grippy, and highly compressible. The compressible layer may be a component of a mountable surface 112 that is integrated with the bottom surface of the housing 110. In other examples, the compressible layer may be a component of a detachable mountable surface 112 that is not integrated with the bottom surface of the housing 110. Furthermore, upon fixedly mounting the housing 110 to the optical instrument, the mountable surface 112 is compressed so that the mountable surface 112 conforms substantially to the contours (e.g., including protrusions and cavities) of the opposing mounting surface of the optical instrument. In particular, when compressed, the mountable surface 112 conforms substantially to the contours of the opposing mounting surface and the bottom surface of the housing across the entire surface area of the mountable surface 112. Owing to the high-friction grippy nature of the compressible layer, when the compressible layer is compressed and conforms substantially to the contours of the optical instrument, the housing 110 is fixedly mounted to the optical instrument, thereby substantially preventing any relative motion of the housing 110 relative to the optical instrument during operation of the guidance system 100. Because the compressible layer is highly conformable upon compression during mounting of the housing 110 to the optical instrument, the mountable surface 112, including the compressible layer, is adaptable and flexible to be fixedly mountable to a range of optical instruments. In one example, the compressible layer may include a highly-compressible polymer foam and/or a soft highly-compressible rubber.

The array of EOIs 130 may include various types of EOIs including (but not limited to) radiation-emitting elements such as light-emitting diodes (LEDs) arranged on a support frame 120. The array of EOIs are communicatively coupled to the electronic module 160 and mechanically coupled to the housing 110 by way of a coupling 140. Coupling 140 is positioned between the housing 110 and the array of EOIs 130, and may include a coupling base 142 that is fixed to the housing 110 at one end, as shown in FIG. 1. In the non-limiting example of FIG. 1, the coupling base 142 is depicted as rigid block. Coupling 140 may be coupled to a coupling tab 144 of the support frame 120 by way of one or more fasteners 146. As shown in the example of FIG. 1, coupling tab 144 may include a portion of the support frame 120 that protrudes from the body of the support frame 120 where the array of EOIs are arranged. In other words, coupling tab 144 is bare of EOIs. Coupling tab 144 may include one or more fastening components such as holes or openings 147 for facilitating coupling of the support frame 120 to the housing 110 by way of the fasteners 146. In the example of FIG. 1, the fasteners 146 include rigid rods or dowels that are embedded and/or affixed to the coupling base 142 at one end, and insert into the holes 147 at the other end, to couple the coupling tab 144 to the coupling base 142.

The array of EOIs 130 are mounted on the support frame 120. Support frame 120 provides a rigid support for the array of EOIs 130 so as to aid in fixing a position of the array of EOIs 130 relative to an eyepiece of an optical instrument when the housing 110 is mounted to the optical instrument. A thickness 124 (e.g., in the x-direction) of the support frame 120 may be less than an upper threshold thickness so as to not obfuscate a field of view when the operator looks through an eyepiece of the optical instrument while the housing 110 is mounted to the optical instrument. Conversely, a thickness 124 of the support frame 120 may be greater than a lower threshold thickness so as to provide enough rigidity and support to the array of EOIs to mitigate deformation of the support frame 120 while mounting and operating the guidance system 100, and while operating the optical instrument.

In some examples, the support frame 120 may be detachably mountable to the eyepiece 322 of the optical instrument. Detachably mounting the support frame 120 to the eyepiece 322 may aid in fixing a position of the support frame 120 so as to fix a position of the array of EOIs 130 at a perimeter of the eyepiece, and so as to position the array of EOIs 130 to be only peripherally visible to the operator and without obstructing the field of view of the eyepiece while the operator is looking through the eyepiece 322. Devices for detachably mounting the support frame 120 to the eyepiece 322 may include various types of reusable fasteners, including but not limited to reusable adhesive, screws, straps, clips, and the like.

The array of EOIs can include a plurality of EOIs arranged to be evenly spaced about a perimeter of the support frame 120. Evenly spacing the plurality of EOIs about the perimeter of the support frame may advantageously allow for more flexibly configuring the output of the EOIs to suit a broad range of applications. In other examples, the EOIs may be non-uniformly spaced about a perimeter of the support frame 120. Spacing the EOIs non-uniformly about the perimeter of the support frame 120 may advantageously facilitate clearer demarcation of sub-arrays of EOIs, included in the array of EOIs 130, where each subarray of EOIs is configured to indicate a different output responsive to different sensor signals transmitted received at the electronic module 160 (as further described herein with reference to FIGS. 6, 7, 10, and 12).

In the non-limiting example of FIG. 1, the array of EOIs includes about 50 EOIs. A number of EOIs included in the array of EOIs may be greater than a lower threshold number of EOIs to enable finer resolution when indicating outputs during operation of the guidance system 100, as described in further detail herein. Conversely, the number of EOIs included in the array of EOIs may be less than an upper threshold number of EOIs to maintain visual clarity when the array of EOIs are viewed peripherally while looking through the eyepiece of the optical instrument. For the case where the number of EOIs is greater than the upper threshold number, the size of individual EOIs may be smaller (in order to be accommodated on the support frame 120) and more difficult to resolve and distinguish from adjacent EOIs in the array of EOIs 130. Generally, larger support frames may accommodate a greater number of EOIs, whereas smaller support frames may accommodate a fewer number of EOIs.

Support frame 120 further includes an opening 128. A size and shape of the opening 128 may correspond to a size and shape of an outer perimeter of an eyepiece of the optical instrument to be utilized with the guidance system 100. In one example, the size and shape of opening 128 may match a size and shape of the eyepiece, and a perimeter of the opening may be equivalent to or slightly larger than the outer perimeter of the eyepiece. In this way, a positioning of the array of EOIs about the perimeter of the eyepiece may not obstruct the field of view of the eyepiece while looking therethrough. Furthermore, positioning of the array of EOIs about the perimeter of the eyepiece positions each of the array of EOIs 130 peripherally to the eyepiece such that each of the array of EOIs is only peripherally visible (e.g., within an operator's peripheral vision) while the operator is looking through the eyepiece without obstructing the field of view of the eyepiece.

As shown in FIG. 1, the array of EOIs 130 may be evenly positioned around a perimeter of the opening 128, and thus are evenly positioned around a perimeter of the eyepiece. In other words, the array of EOIs 130 may span an entire perimeter of the eyepiece and may be evenly distributed on the support frame 120 in all directions (e.g., 360 degrees) about an axis 129 of the support frame 120. Positioning EOIs around the entire perimeter of the opening 128 in this way advantageously facilitates indicating directional outputs in all directions (e.g., 360 degrees) when operating the guidance system 100. For example, the ability for the guidance system 100 to indicate directional outputs in all directions by way of the array of electronic output indicators 130 can aid in precisely indicating a location of an observed target relative to the operator. In another example, a precision of indicating a position of a second guidance system relative to the operator may be increased.

The shape of the support frame 120 and opening 128 may be circular and annular, as shown in FIG. 1, since optical instrument eyepieces are generally round. However, in other examples, the shape of the support frame 120 may include other geometries. For instance, in the case of a guidance system for binoculars, the support frame 120 may be ovular or dual lobed annuli so that the array of EOIs may include EOIs positioned around a perimeter of both eyepieces. In another example, two round annular support frames may be coupled to a guidance system 100, wherein one of the two support frames are positioned at each eyepiece of the binocular. In general, a shape and size of the support frame 120 may depend and be matched to the particular type of optical instrument. A radial thickness 125 of the support frame 120 may be large enough to just accommodate mounting a single (annular) row of EOIs thereon, as depicted in FIG. 1. Limiting the radial thickness 125 of the support frame 120 may aid in mitigating a weight and bulk of the support frame 120 so that it is not obtrusive to the functioning of the optical instrument.

In one embodiment, the coupling 140 may include an adjustable coupling so that the support frame 120 may be repositioned relative to the housing 110, including while the mountable surface 112 is fixedly mounted to the optical instrument. As such, the support frame 120 (and the array of EOIs positioned thereon) may be retracted from the eyepiece of the optical instrument, so that the optical instrument may be operated, optionally, without the support frame 120 positioned peripherally around the perimeter of the eyepiece. In one example, retracting the eyepiece of the optical instrument may facilitate servicing or cleaning the eyepiece without detaching the housing 110 from the optical instrument. Furthermore, repositioning the support frame 120 by way of the adjustable coupling 140 may facilitate fine tuning and customizing a position of the array of EOIs and support frame 120 relative to the eyepiece. Such repositioning may be advantageous by allowing each operator to customize the "fit" of a guidance system 100 to a particular optical instrument. Similarly an adjustable coupling 140 may facilitate a more precise fit of a guidance system 100 to a variety of optical instruments such that the array of EOIs remain peripherally visible without obstructing a field of view of the eyepiece.

In one example, the adjustable coupling 140 may include a hinge that allows for the support frame 120 to be rotated about an transverse axis 148 passing through the coupling and parallel to the y-coordinate axis so that the support frame 120 may be rotated upwards (in a negative z-direction) and away from a plane of the eyepiece (e.g., in FIG. 1, the support frame 120, as depicted, and the plane of the eyepiece are positioned parallel to the to the x-z plane). In another example, the adjustable coupling 140 may include a rotatable hinge that allows for the support frame 120 to be rotated about a rotational axis 149 passing through the coupling and parallel to the x-coordinate axis so that the support frame 120 may be rotated away (e.g., in a clockwise or counter-clockwise direction) from the eyepiece about the rotational axis. Furthermore, the adjustable coupling 140 may include a locking mechanism such that a position of the support frame 120 (and array of EOIs 130 mounted thereon) may be fixed after achieving a desired position by way of the adjustable coupling 140. As non-limiting examples, the locking mechanism may include a screw, bolt, clip, strap, tie, and the like.

In addition to providing a mechanical coupling between the housing 110 and the support frame 120, coupling 140 may also provide for a conductive electrical coupling between the electronic module 160 housed within housing 110 and the array of EOIs 130. In one example, one or more of the coupling base 142, coupling tab 144, fasteners 146, and support frame 120 may include conductive portions therein that are conductively coupled to the electronic module 160 and the array of EOIs 130. As such electronic signals may be transmitted from the electronic module 160 to the array of EOIs 130, and from the array of EOIs 130 to the electronic module 160, by way of the conductive portions of one or more of the coupling base 142, coupling tab 144, fasteners 146, and support frame 120. In one example, the conductive portions of one or more of the coupling base 142, coupling tab 144, fasteners 146, and support frame 120 may include conductive wires 340, and in some examples may further include conduits through which the conductive wires 340 are routed. In another example, the conductive portions of one or more of the coupling base 142, coupling tab 144, fasteners 146, and support frame 120 may include conductive vias connecting metal layers within the support frame 120, akin to those of an integrated circuit on a printed control board (PCB).

In another embodiment the coupling 140 may include a detachable coupling, such that the support frame 120 along with the array of EOIs 130 mounted thereon may be detached and separated from the housing 110. The detachable coupling include fasteners for rigidly and fixedly mounting the support frame 120 to the housing 110. Fasteners may include one or more of screws, bolts, rivets, clips, hook-and-loop fasteners, straps, adhesive, tape, glue, flanges, and the like. Reusable detachable fasteners may be advantageous for detaching and swapping out the detachable mountable surface. Quick-connect and quick-disconnect fasteners may be advantageous for expediting detachment and reattachment of the support frame 120 to the housing 110.

The guidance system 100 may include a plurality of support frames 120, where each of the support frames 120 may be customized and designed for a particular eyepiece, optical instrument, and/or application. Each of the plurality of support frames 120 may be compatible with the detachable coupling such that each of the plurality of support frames 120 can be selected and swapped out with another of the plurality of support frames 120, to facilitate positioning the array of EOIs 130 at a perimeter of the eyepiece while mounting the housing 110 to different types of optical instruments in different guidance system applications, as desired by the operator. In this way, the support frame 120 may be a modular component of the guidance system 100, so that the guidance system 100 may be easily adapted for utilization with a broad range of optical instruments by selecting the suitable support frame 120. Furthermore, a modular support frame 120 may facilitate easier maintenance and servicing of the array of EOIs 130 mounted to the support frame 120, since a modular and detachable support frame 120 may be more easily removed from the guidance system 100 and replaced (e.g., swapped out) with another support frame 120. In another example, owing to different operator preferences or fit, a detachable support frame 120 may be swapped for another detachable support frame 120 when switching an operator of a guidance system 100. The detachable support frame 120 may be changed without changing an operating mode of the guidance system 100.

Furthermore, various support frames 120 (with the array of EOIs 130) may be fabricated and customized to mount and fit to a desired optical instrument. In particular, a shape and size (e.g., diameter, perimeter, thickness) of the support frame may be chosen to match a particular eyepiece of an optical instrument. For example, a plurality of support frames 120 may be designed and customized for mounting to optical scopes of various sorts of firearms. These various firearms may include different types of rifles, shotguns, pistols, handguns, and the like, as well as other types of firearms, such as bows (e.g., compound bows, longbows, and the like). A type and size of optical scope may depend on the firearm type and application; hence, a size and shape of the support frame 120 may be selected to match and mount to different types and sizes of optical scopes. Guidance system 100 may further include a plurality of support frames 120 that are designed and customized for mounting to optical instruments for long-range observation and magnification viewing such as binoculars, and telescopes. Guidance system 100 may further include a plurality of support frames 120 that are designed and customized for mounting to optical instruments in photography applications such as cameras (digital, video, film, SLR, and the like).

FIG. 3 shows a photograph 300 of a guidance system 100 mounted to a scope 310 for a firearm. In the non-limiting example of FIG. 3, the guidance system 100 is shown without sidewalls and a cover of the housing 110; however, the guidance system 100 is mounted to the scope 310 by way of a series of straps 312 and 313. Photograph 300 further shows that the shape and dimension of an outer perimeter of the array of EOIs 130 closely matches a perimeter of the collar 320 of the scope 310 surrounding the eyepiece 322, while the shape and dimension of an inner perimeter of the array of EOIs 130 closely matches the outer perimeter of the eyepiece 322. As such, mounting the guidance system 100 to the scope 310 facilitates positioning of the array of EOIs 130 at a perimeter of the eyepiece 322 of the scope 310, without obstructing a field of view of the eyepiece 322 while the operator looks through the eyepiece 322, and without adding substantial bulk or volume to the scope 310, which could hamper an operator while operating the scope 310.

In the case where the coupling 140 includes a detachable coupling, separating the support frame 120 from the housing 110 may include disconnecting and separating the electrical wired or conductive via connections between the housing 110 and the support frame 120. In such cases, the (detachable) coupling 140 may include a plug-and-socket structure to facilitate reliably quick-connecting and quick-disconnecting the electrical connections between the housing 110 and the support frame 120.

In another embodiment, the array of EOIs 130 may include electronic components therein for communicating wirelessly with the electronic module 160. In the case of wireless communication between the array of EOIs 130 and the electronic module 160, the support frame 120 may be separated from the housing 110, without mechanical coupling or wired conductive coupling. As such, coupling 140, coupling base 142, coupling tab 144 and fasteners 146 may be omitted from the guidance system 100, thereby simplifying a design of the guidance system and facilitating swapping of support frames and/or mountable surfaces 112 since the housing 110 and mountable surface 112 and support frame 120 may all be independently detached from the optical instrument. Furthermore, in the case of wireless communication between the array of EOIs and the electronic module 160, a power source such as a rechargeable battery may be mounted on the support frame 120 and conductively coupled to the array of EOIs 130 for supplying power thereto.

In a further embodiment, wherein the array of EOIs 130 may include electronic components therein for communicating wirelessly with the electronic module 160, the electronic module 160 may be housed in a portable electronic device separate from the array of EOIs 130. As such, the housing 110 may not be mounted to the optical instrument, and mounting surface 112 may be omitted from the housing 110. Wireless communication between the electronic module 160 and the array of EOIs 130 may include one or more wireless technologies such as Bluetooth®, Bluetooth Low Energy (BLE), cellular, global positioning system (GPS), radio-frequency identification (RFID), Zigbee®, and the like. As such, the electronic module 160 may be positioned at a remote location relative to the array of EOIs 130. In one example, the electronic module 160 may be in a remote location separated from the array of EOIs 130 by several feet or several meters. As such, the electronic module 160, by way of the one or more sensors therein, may perform remote sensing of the optical instrument (e.g., position, tilt, recoil, shot timing, wind, weather, spotting, and the like, as described herein) while positioned away and separately from the array of EOIs 130. Additionally or alternatively, one or more sensors local to the optical instrument, such as strain sensors mounted thereat, may provide local sensing of the optical instrument and may transmit sensor signals wirelessly to the electronic module 160.

The electronic module 160 includes a printed circuit board (PCB) 161 and one or more integrated circuits, including various electronic components mounted thereon for controlling the array of EOIs responsive to various sensor signals and operator input. The electronic module 160 is contained within the housing 110 and is mechanically coupled thereto by way of fasteners (not shown in FIG. 1) and the mounting holes 176. In one non-limiting example, the fasteners may include screws which are threaded through the mounting holes 176 and threaded mounts positioned in the housing 110 thereby fastening the electronic module to the housing 110. The electronic module 160 may further be coupled to the coupling base 142 by way of the fasteners 145. As shown in FIG. 1, the coupling base 142 may extend into the housing 110 from the coupling 140, and the fasteners 145 may be impregnated into the coupling base 142 and may also extend through the PCB 161. In one example, one or more of the fasteners 145 and the coupling base 142 may include conductive portions therein that are conductively coupled to the electronic module 160 and to the array of EOIs 130. As such electronic signals may be transmitted from the electronic module 160 to the array of EOIs 130, and from the array of EOIs 130 to the electronic module 160, by way of the conductive portions of one or more of the coupling base 142 and the fasteners 145. In one example, the conductive portions of one or more of the coupling base 142 and fasteners 145 may include the conductive wires 340, and in some examples may further include conduits through which the conductive wires 340 are routed. In another example, the conductive portions of one or more of the coupling base 142 and the fasteners 145 may include conductive vias connecting metal layers within the PCB 161.

The electronic module 160 includes various electronic components, such as a master control unit (MCU) 162 (hereinafter controller 162), one or more operator input devices 164, one or more sensors including an inertial measurement unit (IMU) sensor 166, a storage device 168, a power source 170, a charging port 174, and a wireless communication device 180. Controller 162 may include a microprocessor, an electronic storage medium such as read-only memory for executable programs and calibration values, random access memory, keep alive memory, and a data bus. Storage medium read-only memory can be programmed with computer readable data representing instructions executable by the controller 162 for performing the methods and routines described herein as well as other variants that are anticipated but not specifically listed.

As illustrated in the block representation of the electronic module 160 of FIG. 5, each of the electronic components of the electronic module 160 are conductively coupled to the controller 162 by way of the PCB 161. Controller 162 may thus transmit and receive signals from each of the one or more operator input devices 164, one or more sensors including an inertial measurement unit (IMU) sensor 166, a storage device 168, a power source 170, a charging port 174, and a wireless communication device 180. Operating input devices 164 may include a one or more electronic input devices such as buttons, keys, switches, touch sensitive electronic surfaces (e.g., touch pads, touch screens, and the like). In the non-limiting example of FIGS. 1 and 2, four operator input buttons are depicted. The operator input devices 164 may provide input signals to prompt the controller 162 to execute specific instructions. As non-limiting examples, responsive to input signals received from the operator input devices 164, the controller 162 may power on or off the guidance system 100, select a particular operating mode, allow the operator to input and store data, set operating parameters, display historical data, and send and/or receive signals from another guidance system 100 or portable electronic device 520. Although not shown in FIG. 1, electronic module 160 may further include an operator interface, including an operator display, mounted on an external surface of the housing 110. The operator display may display information pertaining to the guidance system 100 to the operator, such as the current operating mode, available operating modes, an operator identification, an optical instrument type, an application, default settings and/or parameters, and other available settings and/or parameters. As such, the operator interface may present a series of operator menus and interfaces among which the operator can navigate and/or select particular settings and/or parameters by way of the operator input devices 164 and the portable electronic device 520.

The controller 162 may further receive signals from one or more sensors of the electronic module 160. The one or more sensors may include IMU sensor 166. IMU sensor 166 may include an electronic device that is able to measure one or more of an angular motion, orientation, altitude, velocity, acceleration, and position of the guidance system 100, and a force acting on the guidance system 100. For example, in the case where the guidance system 100 is mounted to a firearm scope, the IMU sensor 166 may measure a magnitude, direction, and type of motion (e.g., rotational, translational) of recoil of the firearm when the firearm is discharged, a position (including tilt or cant) of the firearm, and the number of shots discharged from the firearm in real-time. In another example, for the case when the guidance system 100 is mounted to camera or other optical instrument, IMU sensor 166 may measure, a magnitude, direction, and type of motion (e.g., rotational, translational) of recoil of the optical instrument (e.g., for the camera, recoil when a photo is taken), and a position (including tilt or cant) of the optical instrument in real-time. The IMU sensor 166 may include one or more of a gyroscope, accelerometer, and a magnetometer.

Non-limiting examples of the one or more sensors positioned at the electronic module 160 may further include sensors measuring force, acceleration, vibration, global position, orientation, ambient temperature, atmospheric pressure, anemometer, and/or humidity. Each of the one or more sensors may be communicatively coupled to and may transmit signals to the controller 162 of the electronic module 160.

Furthermore, controller 162 may aggregate and store the measured data by time, operator, optical instrument type, and the like. The controller 162 may store and/or retrieve data in memory on board the controller 162 and at storage device 168. As non-limiting examples, storage device 168 may include various types of storage media, such as a solid-state drive and/or a USB drive for portable storage media such as a secure digital (SD) card.

Power source 170 may include one or more power supplying devices such as a photovoltaic cell and a rechargeable battery for supplying power to the guidance system 100, including the controller 162. The controller 162 may direct power from the power source 170 to one or more of the components of the electronic module 160 conductively coupled to the PCB 161, as well as to the array of EOIs 130. Power source 170 may be coupled to a charging port 174 for supplying power to and/or recharging power source 170. Charging port 174 may be coupled to the power source 170, but may be external-facing relative to the housing 110 to facilitate connection to an external power source. The external-facing charging port 174 may be a sealed port so as to maintain integrity of the environmental protection afforded to the electronic module 160 by the housing 110.

Wireless communication device 180 facilitates one or more types of wireless communication (e.g., transmitting and receiving data) to and from the guidance system 100. As non-limiting examples, wireless communication device 180 may enable guidance system 100 to communicate by way of one or more wireless technologies such as Bluetooth®, Bluetooth Low Energy (BLE), cellular, global positioning system (GPS), radio-frequency identification (RFID), Zigbee®, and the like. For example, wireless communication device 180 may include a Bluetooth® chip for wirelessly communicating with Bluetooth® devices. In some examples, wireless communication device 180 may include electronic components enabling Zigbee and BLE wireless communication because they are relatively lower power and lower cost wireless technologies.

Turning now to FIG. 5, it illustrates a block diagram including a first guidance system 501 and a second guidance system 502. The first guidance system 501 and the second guidance system each include one or more sensors 566. The one or more sensors 566 may include an IMU sensor 166. As depicted in the block diagram 500 of FIG. 5, the first guidance system 501 may communicate wirelessly with the second guidance system 502, external sensors 590, and a portable electronic device 520. For instance, data from the first guidance system 501 may be transmitted to the second guidance system 502, and the controller 162 aboard the second guidance system 502 may execute instructions responsive to receiving the data from the first guidance system 501. In one example, the first guidance system 501 and the second guidance system 502 may each be mounted to a scope of two different firearms separated by a distance from each other. A position of an observed target relative to the first guidance system 501 may be determined and the target position information may be translated to the second guidance system 502. In response to receiving the observed target position information at the second guidance system 502, the controller 162 on board the second guidance system 502 may responsively modulate one or more of the array of EOIs 130 at the second guidance system 502 to indicate a bearing towards the observed target position.

Similarly, one or more of the first guidance system 501 and the second guidance system 502 may receive signals from one or more external sensors 590. For instance, data from the one or more external sensors 590 may be received at the first guidance system 501, and the controller 162 on board the first guidance system 501 may execute instructions responsive to receiving the data from the one or more external sensors 590. In one example, the one or more external sensors 590 may correspond to a strain gauge positioned on a barrel of a firearm to indicate hoop and/or axial strain when the firearm is discharged. The strain gauge may transmit signals to the first guidance system 501 wirelessly by way of wireless device 180 or by a wired connection to the electronic module 160 of the first guidance system 501. Responsive to receiving the signal from the strain gauge, the controller 162 on board the first guidance system 501 may modulate one or more of the array of EOIs 130 at the first guidance system 501 to indicate a corresponding level of strain. In some examples, one or more of the external sensors 590 may be coupled to the electronic module by a wired connection.

Portable electronic device 520 may include a smart phone, tablet, laptop, smart watch (or other smart wearable), and the like, capable of wireless communication with the guidance systems 501 and 502. In addition to wireless communication with the guidance systems 501 and 502, portable electronic device 520 may wirelessly communicate with other portable electronic devices 520 as well as the Worldwide Web (WWW) 590 internet. Furthermore, guidance system 100 may include a software application, guidance system app 510, which resides in non-transient memory on board a controller of the portable electronic device 520, and includes instructions that are executable by the controller of the portable electronic device 520 while the guidance system is operating. As shown in FIG. 5, guidance system app 510 may retrieve data from the internet including but not limited to GPS, weather, wind, and the like. Other types of data available from the internet may be retrieved as well. The data retrieved from the internet at the portable electronic device 520 may be real-time data or historical data. Guidance system app 510 may store the data retrieved from the internet in memory on board the portable electronic device 520 and may also store data to a cloud data storage system by way of the internet connection.

Portable electronic device 520 may also receive data from one or more guidance systems 501 and 502, which may be stored and/or aggregated by the guidance system app 510. For example, in the case for a guidance system 100 for a firearm scope, the guidance system app 510 may collect performance data from the guidance system 100 such as, but not limited to, recoil, number of shots fired, barrel wear, and shot profiles (e.g., shot split times, firearm setup time before each shot, and the like). In another example, while executing an operating mode of the guidance system 100, the performance data may be aggregated by each shooting stage of a competition so that a shot profile by stage may be generated, including but not limited to a shot profile for a given stage, shot split times and statistics for that stage, average recoil, time to get on target and break each shot on average, time to transition to a new position and to setup the firearm. The collected performance data may further be aggregated by the guidance system app 510 by operator, time, firearm type, and the like. Further still, the number of shots discharged for each device may be stored as an indication of barrel wear. Furthermore, the collected performance data may be displayed at the portable electronic device 520 or exported to another portable electronic device 520 and/or the WWW 590. In another example, performance data may be stored in a cloud-based data storage system by way of a subscription service through the guidance system app 510. Other cloud-based services may include making available anonymized shooter data for a given competition stage for comparison to an operator's performance during that competition stage.

Although not shown in FIG. 5, portable electronic device 520, by way of guidance system app 510, includes an operator interface, including an operator display. The operator display may display information pertaining to the guidance system 100 to the operator, such as the current operating mode, available operating modes, an operator identification, an optical instrument type, an application, default settings and/or parameters, and other available settings and/or parameters. As such, the operator interface of portable electronic device 520 may present a series of operator menus and interfaces among which the operator can navigate and/or select particular settings and/or parameters by way of the portable electronic device 520. The information presentable at the operator interface of the portable electronic device 520, by way of guidance system app 510, may include the sequence of menus and operator interfaces presentable at the operator interface of the electronic module 160 displayed at housing 110.

Guidance system app 510 may further communicate with the controllers 162 of guidance systems 501 and 502 in other ways. In particular, the guidance system app 510 may include an operator interface that facilitates remote control of guidance systems 501 and 502. For example, operator input may be received at the operator interface of the guidance system app 510 that directs the controller 162 of guidance systems 501 and/or 502 to power on or off the guidance system, select a particular operating mode, allow the operator to input and store data, set operating parameters, display historical data, and send and/or receive signals between guidance systems or to/from the portable electronic device 520. As such any functions available by way of operator input devices 164 may be available by way of operator input at the operator interface of the guidance app 510.

Thus, the one or more of the first guidance system 501 and the second guidance system 502 may receive signals from the portable electronic device 520. For instance, data from the portable electronic device 520 may be received at the first guidance system 501, and the controller 162 on board the first guidance system 501 may execute instructions responsive to receiving the data from the portable electronic device 520. In one example, the portable electronic device 520 may correspond to a smart tablet. The smart tablet may gather data such as real-time GPS data, as well as wind speed and wind direction from the internet, and may wirelessly transmit the data to one or more of the first guidance system 501 and the second guidance system 502. Thus, responsive to receiving the wind speed and direction data from the portable electronic device 520, the controller 162 on board one or more of the first and second guidance systems 501 and 502, may modulate one or more of the array of EOIs 130 to indicate a corresponding wind speed and direction. In the case where the first and second guidance systems 501 and 502 are mounted to firearm scopes, the operator of the guidance systems 501 and 502 may adjust the firearms accordingly responsive to receiving the indications of wind speed and direction at the array of EOIs 130.

As described herein, the array of EOIs 130 may be mounted on the support frame 120 and communicatively coupled to the controller 162. Each of the array of EOIs may be independently controlled by the controller 162 such that a state of each of the array of EOIs maybe modulated responsive to signals received at the controller 162, including signals received at the controller 162 from one or more sensors positioned at the guidance system 100 (including IMU sensor 166), one or more external sensors 590 positioned external to the guidance system 100, one or more portable electronic devices 520 (including signals from guidance system app 510 residing in memory on board portable electronic device 520), or one or more sensors positioned at other guidance systems 100. Modulating a state of each of the array of EOIs 130 may include changing a power on/off state, an intensity state, a blink frequency state, a color state, and the like. In the case where the EOIs are LEDs, an intensity state may correspond to an output brightness, a blink frequency state may correspond to a number of blinking (e.g., on/off cycle) periods in a particular time interval, and a color state may correspond to a chromaticity or hue of the output radiation. In other cases, the array of EOIs 130 may include haptic output indicators, aural output indicators, or other type of visual output indicators. In further examples, the array of electronic output indicators 130 may include a mixture of visual, haptic, and/or aural output indicators.

The array of EOIs 130 may include and be divided into a plurality of subarrays of EOIs (herein also referred to as EOI subarrays). The division of the array of EOIs 130 into the plurality of subarrays of EOIs may be determined by the controller 162 according to a selected operating mode. For example, responsive to a selected operating mode of the guidance system 100, the controller 162 may determine a number of subarrays of EOIs, a number of EOIs in each of the subarrays, and a position of each subarray of EOIs in the array of EOIs 130. Furthermore, responsive to a selected operating mode of the guidance system 100, the controller 162 may determine how to modulate the states of each EOI in each subarray of EOIs according to a signal received from one or more sensors positioned at the guidance system 100 (including IMU sensor 166), one or more external sensors 590 positioned external to the guidance system 100, one or more portable electronic devices 520 (including signals from guidance system app 510 residing in memory on board portable electronic device 520), or one or more sensors positioned at other guidance systems 100. In particular, the states each of the subarrays of EOIs may be modulated responsive to a different sensor or set of one or more sensors from the other subarrays of EOIs. In other words, each subarray of EOIs may be modulated by the controller 162 to indicate a different value or condition measured by a different sensor or a different set of one or more sensors.

As illustrated in FIG. 2, the array of EOIs 130 is divided into three subarrays of EOIs by the controller 162. A first subarray of EOIs 240 includes 6 LED elements positioned at the top portion of the array of EOIs 130, a second subarray of EOIs 242 includes 24 LED elements positioned at a first left side of the array of EOIs 130, and a third subarray of EOIs 244 includes 18 LED elements positioned at a second right side of the array of EOIs 130. Each of the first, second and third subarrays of EOIs 240, 242, and 244 may be modulated independently responsive to a different set of one or more sensor signals received at the controller 162. In the example of FIG. 2, the array of EOIs 130 is divided into a plurality of contiguous subarrays of EOIs. In other words, the subarrays of EOIs utilize all of the EOIs in the array of EOIs 130, and each subarray of EOIs is positioned directly adjacent to another subarray of EOIs. In other examples, the array of EOIs 130 may be divided into one or more discontiguous subarrays of EOIs; in other words, the subarrays of EOIs may not utilize all of the EOIs in the array of EOIs 130, and one or more of the EOIs in the array of EOIs 130 may not be modulated responsive to one or more sensor signals received at the controller 162. Utilizing all of the EOIs in the array of EOIs 130 may be advantageous in increasing a precision and resolution of the indicated output, while not utilizing all of the EOIs in the array of EOIs 130 may be advantageous in allowing for clearer demarcation between each of the subarrays of EOIs (since there could be inactive EOIs positioned between the active subarrays of EOIs), and in reducing energy consumption from the power source 170.

In a further example, one or more of the EOIs of the array of EOIs 130 may be included in more than one subarray of EOIs. Under such conditions, the one or more of the EOIs of the array of EOIs 130 included in more than one subarray of EOIs may be modulated responsive to signals received from a plurality of different sets of sensor signals received at the controller 162. In this way, the one or more EOIs may exhibit multiplicity with respect to their modulation being responsive to a plurality of different sets of sensor signals. Furthermore, the one or more EOIs may exhibit multiplicity with respect to their modulation being simultaneously responsive to a plurality of different sets of sensor signals.

In other words, a subarray of EOIs may have multiple simultaneous modes of modulation in the same operating mode of the guidance system 100, especially when one or more of the plurality of subarrays of EOIs overlap.

In some cases the modulation of the state of an EOI with respect to the two different sets of sensor signals may be mutually exclusive with respect to the output displayed by the EOIs to aid in distinguishing to which subarray of EOIs the output indication corresponds. As non-limiting examples, the modulation of the state of an EOI with respect to the two different sets of sensor signals may be mutually exclusive with respect to the output displayed by the EOIs by having a first plurality of output indications corresponding to a first subarray of EOIs, and a second plurality of output indications corresponding to a second subarray of EOIs, wherein each of the first plurality of output indications is different from each of the second plurality of output indications. For instance, modulating the color state of an LED element as red, blue or yellow may correspond to output indications of a first subarray of EOIs, whereas modulating the color state of the same LED element as green or white may correspond to output indications of a second subarray of EOIs. As another non-limiting example, modulation of the state of an EOI with respect to the two different sets of sensor signals may be mutually exclusive with respect to the output displayed by the EOIs by separating with respect to time, a first plurality of output indications corresponding to a first subarray from a second plurality of output indications corresponding to a second subarray. For instance, modulating the color state of an LED element as red, blue or yellow prior to a particular event in time may correspond to output indications of a first subarray of EOIs, whereas modulating the color state of the same LED element as red, green or white after to a particular event in time, may correspond to output indications of a second subarray of EOIs. Moreover, a state of one or more of the array of EOIs 130 may further be modulated by the controller 162 responsive to a sensor signal indicating that the particular event in time has occurred.

Modulating a state of each of the array of EOIs 130 may further include modulating a state of one or more EOIs responsive to an elapsed time measured at a computer processor of the controller 162, or by an electronic timer of the guidance system 100, external sensor 590, and/or portable electronic device 520. The elapsed time may be measured relative to a specific event, and the event may be detected by way of a signal received at the controller 162 by one or more sensors. In other examples, the event may be initiated responsive to operator input received at one or more operator input devices 164 or by way of the guidance system app 510. The output of the one or more EOIs may be modulated to indicate multiple elapsed time thresholds such that each successive change in state of the EOIs indicates surpassing a successive elapsed time threshold. As a non-limiting example, a color of an LED EOI may be changed from OFF to green when an elapsed time is greater than a first elapsed time threshold, green to yellow after a second elapsed time threshold, and yellow to red after a third elapsed time threshold, wherein the third elapsed time threshold is greater than the second elapsed time threshold and the second elapsed time threshold is greater than the first elapsed time threshold.

Figure 6:
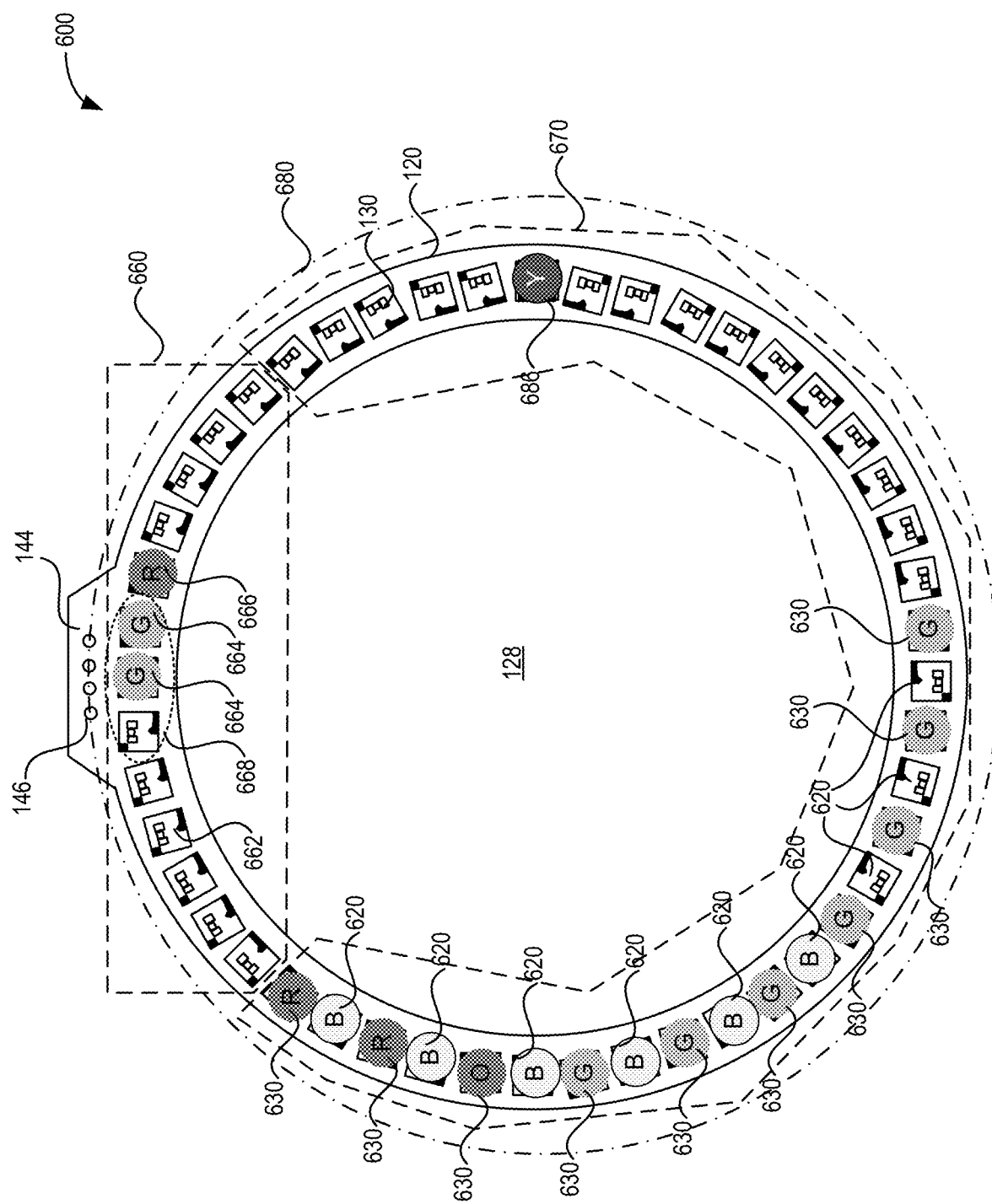
FIG. 6 shows a frontal view of an exemplary array of electronic output indicators corresponding to a first competitive shooting operating mode, of the guidance system of FIG. 1.

Turning to FIG. 6, it shows an example case of modulating a state of each of the array of EOIs 130. FIG. 6 depicts an EOI assembly 600, including a support frame 120 with an array of EOIs 130 mounted thereon. The EOI assembly 600 may be coupled to a housing 110, including an electronic module 160 of a guidance system 100 mounted to an eyepiece of an optical scope for a firearm. Mounting the housing 110 to the eyepiece of the optical scope may position the array of EOIs 130 at a perimeter of the eyepiece so that the array of EOIs 130 are peripherally visible to the operator of the firearm and guidance system 100 while looking through the eyepiece. In the non-limiting example of FIG. 6, an operating mode selected for the guidance system 100 corresponds to a Precision Rifle Shooting (or Precision Rifle Series) (PRS) competitive shooting mode. As described herein, the PRS operating mode may be selected responsive to input received at one or more operator input devices 164, and the guidance system app 510 on board a portable electronic device 520. Responsive to selecting the PRS operating mode, the controller 162 divides the array of EOIs 130 into a first subarray of EOIs 660, a second subarray of EOIs 670, and a third subarray of EOIs 680. The first subarray of EOIs 660 and the second subarray of EOIs 670 are each contiguous arrays of LED elements that do not overlap. The third subarray of EOIs 680 is a contiguous array of LED elements that overlaps with both the first subarray of EOIs 660 and the second subarray of EOIs 670.

The first subarray of EOIs 660 includes an array of 13 LED elements grouped contiguously at the top quarter portion of the array of EOIs 130, and corresponds to a levelling of the firearm. The level status (e.g., tilt, cant) of the firearm may be detected by the IMU sensor 166 on board the guidance system 100. According to the PRS operating mode, the color states of the LED elements of the first subarray of EOIs 660 are modulated by the controller 162 to indicate the level status of the firearm. As shown, the LED elements may be OFF (662), green (G, 664), red (R, 666), or yellow (not shown). For the case where the firearm is level, a color state of a group of 3 LED elements 668 within the first subarray of EOIs 660 may be changed to green. A color state of one or more of the group of 3 LED elements 668 not being green indicates that the firearm is not level. Furthermore, a color state of the 5 LED elements in the first subarray of EOIs 660 positioned to the left of the group 668 may be modulated to indicate a cant or tilt of the firearm towards the left direction, while a color state of the 5 LED elements in the first subarray of EOIs 660 positioned to the right of the group 668 may be modulated to indicate a cant or tilt of the firearm towards the right direction. Further still, a color of these LED elements may be changed to yellow for moderate tilting angles relative to level, and red for more severe tilting angles relative to level. Similarly, a larger number of yellow or red LED elements in the first subarray of EOIs 660 may indicate a more severe tilt or cant of the firearm, while a smaller number of yellow or red LED elements in the first subarray of EOIs 660 may indicate a less severe tilt or cant of the firearm. In this way, the first subarray of EOIs 660 provides the operator with a peripheral visual display of level status of the firearm, according to PRS competitive shooting regulations.

In another example, a color state of the 5 LED elements in the first subarray of EOIs 660 positioned to the left of the group 668 may be modulated to indicate a cant or tilt of the firearm towards the right, and that the firearm may be levelled by adjusting a cant of the firearm towards the left. Conversely, a color state of the 5 LED elements in the first subarray of EOIs 660 positioned to the right of the group 668 may be modulated to indicate a cant or tilt of the firearm towards the left, and that the firearm may be levelled by adjusting a cant of the firearm towards the right direction. Further still, a color of these LED elements may be changed to yellow for moderate tilting angles relative to level, and red for more severe tilting angles relative to level (e.g., a larger adjustment is needed to restore the firearm to level). Similarly, a larger number of yellow or red LED elements in the first subarray of EOIs 660 may indicate a more severe tilt or cant of the firearm, while a smaller number of yellow or red LED elements in the first subarray of EOIs 660 may indicate a less severe tilt or cant of the firearm. In this way, the first subarray of EOIs 660 provides the operator with a peripheral visual display of level status of the firearm, according to PRS competitive shooting regulations.

According to the selected PRS operating mode of the guidance system 100, the second array of EOIs 670 provides a visual indication to aid the operator (e.g., the shooter) in maintaining their shots on pace with the PRS regulations by displaying the number of available shots, and the time available to the operator for discharging each shot. The second subarray of EOIs 670 includes the 35 LED elements arranged below the first subarray of EOIs 660, where alternate LED elements correspond to a shot counter for shots discharged from the firearm and a shot timer, respectively. In particular, the second subarray of EOIs 670 may indicate the number of detected shots discharged from the firearm, responsive to signals received from an IMU sensor 166, while the time remaining to fire each shot is measured by a timer at the guidance system 100 or the guidance system app 510. Specifically, each of the number of available shots are indicated by displaying blue (B) color state for the LED elements 620 (e.g., FIG. 6 shows 6 remaining available shots); the time available to the operator for discharge each of the shots is indicated by a color state of the LED elements 630 corresponding to each of the shots indicated by LED elements 620. Initially, a color state for the shot timer LED elements 630 may be green; when a shot timer decreases below a first threshold time, the controller 162 may responsively change a color state of the shot timer LED element 630 to orange (O); when a shot timer decreases below a second threshold time (e.g., less than the first threshold time), the controller 162 may responsively change a color state of the shot timer LED element 630 to red (R). In one example, the first threshold time may include 15 s, and the second threshold time may include 10 s. After a shot is discharged, the controller 162 may responsively change a color state of the LED element 620 corresponding to that shot from blue to OFF (as shown near the bottom of the array of EOIs 130, in FIG. 6, indicating 3 shots already discharged). Furthermore, the controller 162 may maintain a color state of a shot timer LED element 630 corresponding to a shot, even after the shot is discharged. In this way, the second subarray of EOIs 670 provides the operator with a peripheral visual display of the available shots and the time for each available shot, according to PRS competitive shooting regulations.

According to the selected PRS operating mode of the guidance system 100, the third array of EOIs 680 provides a peripheral visual indication of the recoil magnitude and direction upon trigger pull and shot break of the firearm. The third subarray of EOIs 680 includes all of the LED elements in the array of EOIs 130, and the indication displayed at each of the LED elements corresponds to a recoil direction of the firearm following discharge of the firearm. In particular, responsive to signals received from the IMU sensor 166, the controller 162 changes a color state of an LED element 686 to yellow, where a position of that LED element coincides with a direction of the firearm recoil upon discharge of the shot. In one example, the change of the color state of the LED element to yellow may be a momentary flash lasting a threshold duration. In the example of FIG. 6, the recoil of the firearm is indicated towards the right (when viewing FIG. 6). For the case where the firearm setup is proper, a recoil direction following a firearm discharge may be vertical (e.g., where the controller 162 changes a color state of the topmost LED element to yellow for the threshold duration). As such, following discharge of each shot from the firearm, the operator receives an indication of the direction of recoil in their peripheral vision. Because all of the array of EOIs 130 are included in the third subarray of EOIs 680, all possible recoil directions (e.g. 360 degrees relative to the eyepiece and field of view of the operator) may be accurately indicated.

The third subarray of EOIs 680 overlaps with the first subarray of EOIs 660 and the second subarray of EOIs 670. As such, the LED elements in first subarray of EOIs 660 exhibit multiplicity with respect to their modulation being simultaneously responsive to signals received from the IMU sensor 166 indicating a level status of the firearm and signals received from the IMU sensor indicating a recoil direction. Similarly, the LED elements in second subarray of EOIs 670 exhibit multiplicity with respect to their modulation being simultaneously responsive to signals received from the IMU sensor 166 and a timer indicating a shot number discharged and a time elapsed before a discharged shot number, respectively, of the firearm, and signals received from the IMU sensor indicating a recoil direction. As such, changing the color state of an LED element in the third subarray of EOIs 680 for only the threshold duration may aid in mitigating confusion of the output indications of the third subarray of EOIs 680 with those of the first and second subarrays of EOIs 660 and 670, respectively. In this way, the third subarray of EOIs 680 provides the operator with a peripheral visual display of the recoil of the firearm, following discharge of each shot, according to PRS competitive shooting regulations.

The PRS operating mode of the guidance system 100 may further include parameters that are configurable by way of the operator input devices 164 and/or the guidance system app 510. The selected operating mode, configurable parameter values, and performance data may all be stored in memory at the electronic module 160 and/or the guidance system app 510 on board the portable electronic device 520. Non-limiting examples of configurable parameters are shown in Table 1:

TABLE 1

Configurable Parameters for PRS operating mode

| Parameter type | Description |
| --- | --- |
| Operator ID | Operator profile information (ID number, name, handedness, history) |
| Device ID | Firearm type (firearm specs), firearm wear |
| Date | Current date (year, month, day, time) |
| Number of shots | Discrete (1 to 20 or 1 to upper threshold number) |
| Time available per shot | Discrete time (seconds) |
| Level angle sensitivity | 0.2-4 degrees in 0.1 degree steps |
| Level angle mode | Bubble or ball or accelerometer |
| Recoil sensitivity | Dry fire; Small calibration, Large calibration; discrete increments of 0.1 G |

The operator identification (ID) parameters may include data related to an operator's personal profile such as an operator ID number, name, address, age, shoot handedness, competitive shooting performance history, and the like; the firearm device ID parameters may include a firearm type, firearm specifications (e.g., make and model, technical shooting device specifications), and firearm wear. Firearm wear may be calculated from firearm usage data tracked by the guidance system 100 and/or input by the operator. The date parameters may include current year, month, day and time, including a duration, associated with utilization of the guidance system 100. The number of shots discharged during a PRS shooting stage may be configured from 1 to an upper threshold number of shots (e.g., 20 shots). A time available for discharging each shot may be specified; each shot may be assigned its own shot time independently. A level angle sensitivity may be configured from a lower threshold level sensitivity to an upper threshold level sensitivity (e.g., 0.2 to 0.4 degrees in 0.1 degree steps). A level mode may be configured according to a particular level measuring mechanism. Furthermore, a recoil sensitivity may be configured according to the type of ammunition, as dry fire (e.g., no ammunition), small calibration, large calibration, and the like. Additionally, recoil sensitivity may be configured to be measured in discrete threshold increments (e.g., 0.1 G).

Performance data collected by the guidance system 100 across multiple operating modes can be stored and aggregated by any one or more of the configurable parameters of the selected operating mode, and this data can be retrieved and displayed at the operator interface displayed at the housing 110 or at the guidance system app 510 of a portable electronic device 520. For example, an operator could retrieve and compare their performance data for a particular firearm type over the last 5 years. In another example, an operator could retrieve and compare performance data for a particular firearm type firing large calibration ammunition during PRS stages over all left-handed operators over the last 10 years.

Other functions available through the guidance system app 510 include storing and organizing performance data in a date-time folder structure. In this way, historical data may be retrieved by an operator and displayed at the portable electronic device 520 (or exported to another electronic device). Furthermore, historical shot performance may be simulated and "played back". For example, a shot trajectory 1354 and the resulting shot landing 1352 on a target 1302 may be plotted and displayed graphically or schematically, as shown in schematic 1350. Furthermore, multiple shot trajectories 1314, 1324, 1334 can be overlaid, including where the discharged shots landed (1310, 1320, 1330, respectively) on a target 1302, as depicted in schematic 1300 of FIG. 13. Further still, time information, including time between shots, can be aggregated for any number of selected shots.

Figure 7:
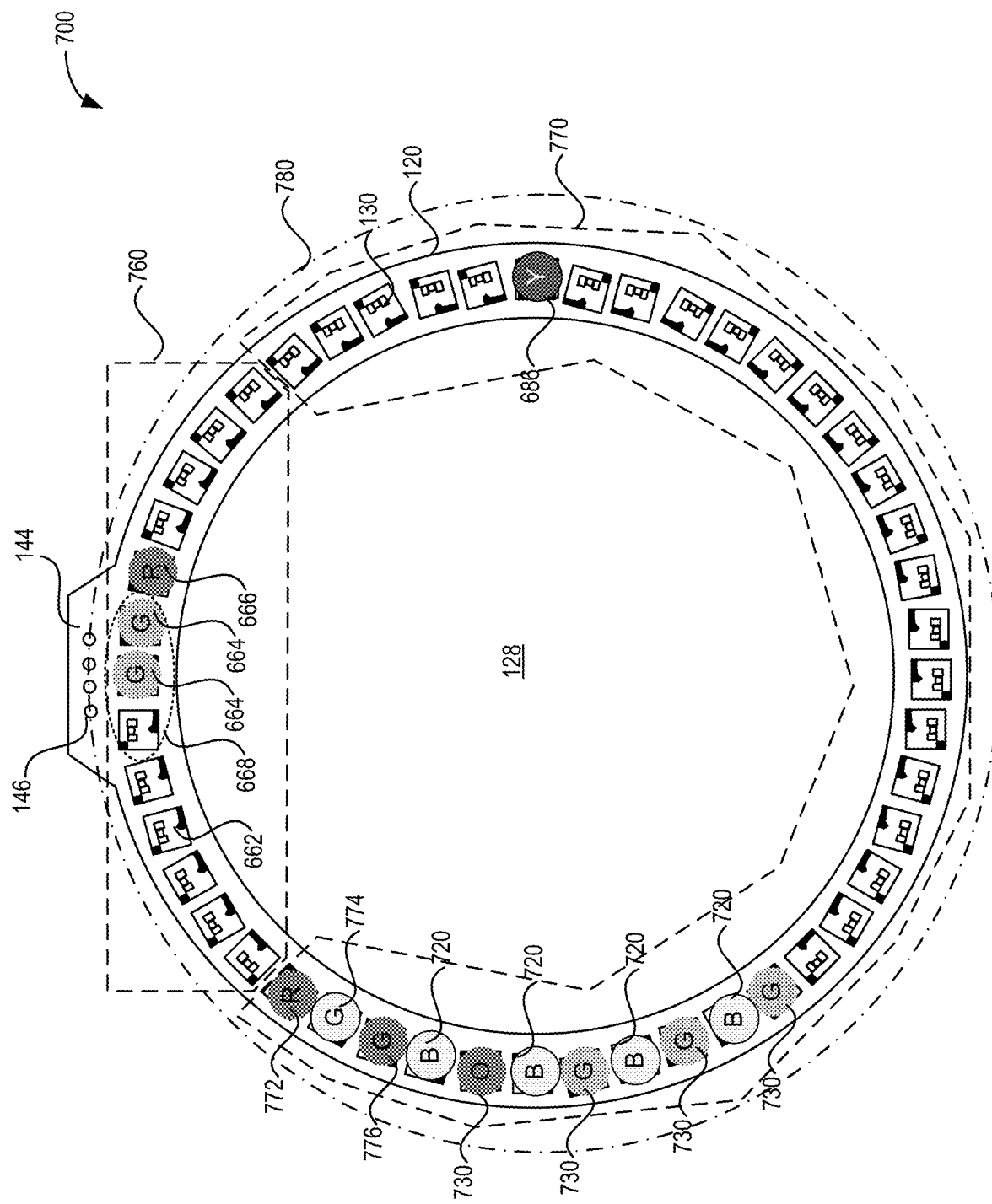
FIG. 7 shows a frontal view of an exemplary array of electronic output indicators corresponding to a second competitive shooting operating mode, of the guidance system of FIG. 1.

Turning to FIG. 7, it shows another example case of modulating a state of each of the array of EOIs 130. FIG. 7 depicts an EOI assembly 700, including a support frame 120 with an array of EOIs 130 mounted thereon. The EOI assembly 700 may be equivalent to the EOI assembly 600 (e.g., including equivalent number of LED elements, equivalent shape and dimensions of support frame 120), such that EOI assembly 700 may be coupled to a housing 110, including an electronic module 160 of a guidance system 100 mounted to an eyepiece of an optical scope for a firearm. Mounting the housing 110 to the eyepiece of the optical scope may position the array of EOIs 130 at a perimeter of the eyepiece so that the array of EOIs 130 are peripherally visible to the operator of the firearm and guidance system 100 while looking through the eyepiece. In the non-limiting example of FIG. 7, an operating mode selected for the guidance system 100 corresponds to a National Rifle League (NRL) Hunter competitive shooting mode. As described herein, the NRL Hunter operating mode may be selected responsive to input received at one or more operator input devices 164, and the guidance system app 510 on board a portable electronic device 520. Responsive to selecting the NRL Hunter operating mode, the controller 162 divides the array of EOIs 130 into a first subarray of EOIs 760, a second subarray of EOIs 770, and a third subarray of EOIs 780. The first subarray of EOIs 760 and the second subarray of EOIs 770 are each contiguous arrays of LED elements that do not overlap. The third subarray of EOIs 780 is a contiguous array of LED elements that overlaps with both the first subarray of EOIs 760 and the second subarray of EOIs 770.

In the non-limiting example of FIG. 7, the positioning and modulation (responsive to selecting the NRL Hunter operating mode) of the first subarray of EOIs 760 and the third subarray of EOIs 780 for the NRL Hunter operating mode are equivalent to the positioning and modulation (responsive to selecting the PRS operating mode) of the first subarray of EOIs 660 and the third subarray of EOIs 680 for the PRS operating mode, as described with reference to FIG. 6. In other words, the first subarray of EOIs 760 may be modulated by the controller 162 to indicate a level status of the firearm, and the third subarray of EOIs 780 may be modulated by the controller 162 to indicate a recoil direction responsive to discharging the firearm. Furthermore, the positioning and number of LED elements in the second subarray of EOIs 770 may be equivalent to that of the second subarray of EOIs 670.

According to the selected NRL Hunter operating mode of the guidance system 100, the second array of EOIs 770 provides a visual indication to aid the operator (e.g., the shooter) in maintaining their shots on pace with the NRL Hunter regulations by displaying the number of available shots, and the time available to the operator for discharging each shot. The second subarray of EOIs 770 includes the 35 LED elements arranged below the first subarray of EOIs 760, where alternate LED elements correspond to a shot counter for shots discharged from the firearm and a shot timer, respectively. In particular, the second subarray of EOIs 770 may indicate the number of detected shots discharged from the firearm, responsive to signals received from an IMU sensor 166, while the time remaining to fire each shot is measured by a timer at the guidance system 100 or the guidance system app 510.

Figure 8:
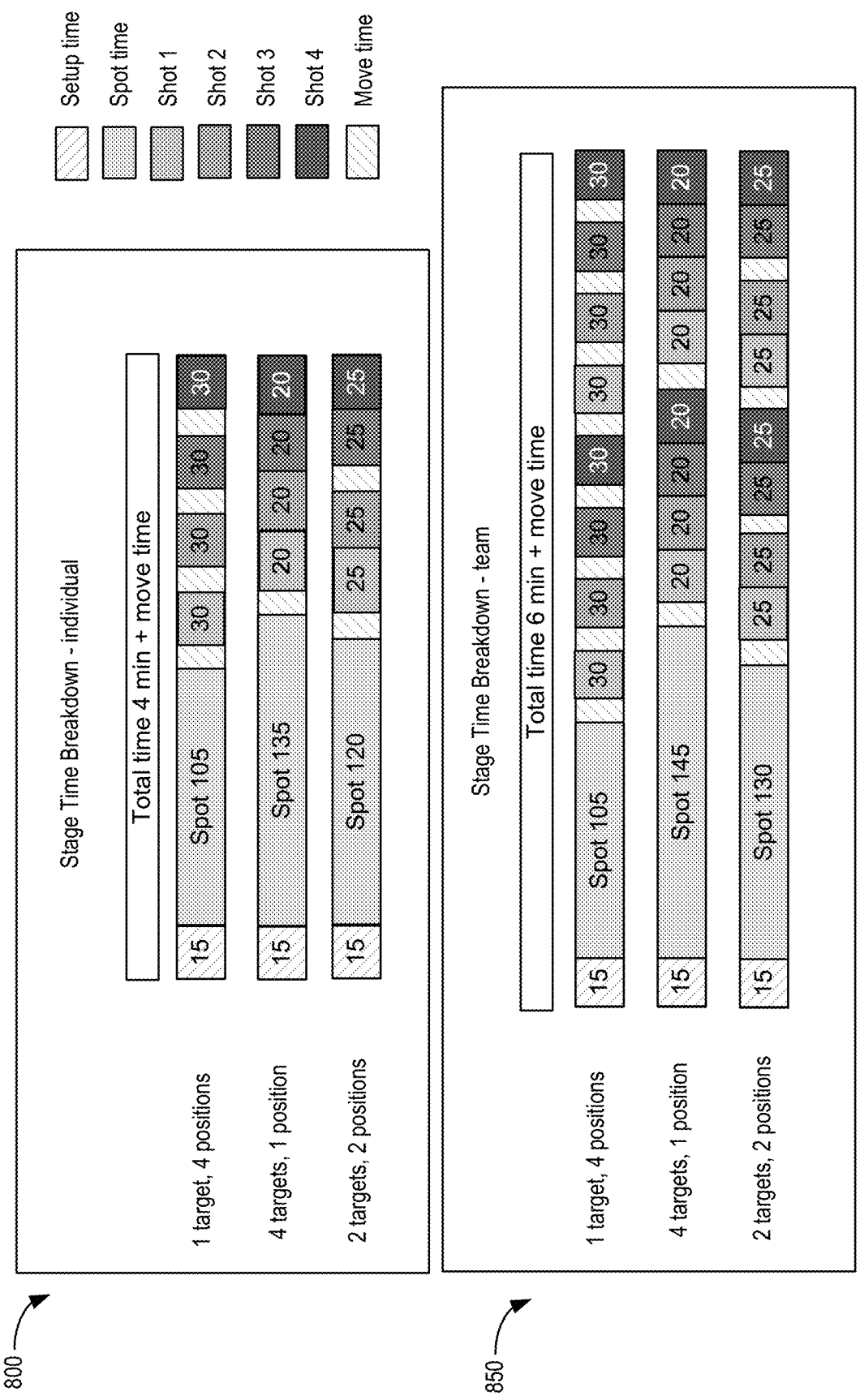
FIG. 8 shows a schematic illustrating parameters for an exemplary operating mode of the guidance system for an optical instrument of FIG. 1.

Referring to FIG. 8, it illustrates various non-limiting configurations for a competitive shooting mode. In particular, various examples of competitive shooting Stage Time Breakdowns are depicted in schematics 800 and 850. Individual Stage Time Breakdowns configurations are shown in schematic 800 where a total time parameter is configured at 4 minutes, excluding move times. In one non-limiting example, the competitive shooting Stage Time Breakdowns (Individual and/or Team) may correspond to NRL Hunter competitive shooting Stage Time Breakdowns. The first Individual Stage Time Breakdown configuration specifies shooting a single target from four different positions; prior to shooting, the operator is permitted 15 seconds for setup, and 105 seconds for spotting the target; the operator is permitted 30 seconds for discharging a shot from each of the 4 positions (a total of 4 minutes); prior to taking each shot, the operator may be permitted a configurable move time to reach the new position. In one example, shooting positions may refer to standard prone, sitting, kneeling, and standing shooting positions. The second Individual Stage Time Breakdown configuration specifies shooting four targets from a single position; prior to shooting, the operator is permitted 15 seconds for setup, and 135 seconds for spotting the four targets; the operator is permitted 20 seconds for discharging each of the 4 shots from the single position (a total of 4 minutes); prior to taking the first shot, the operator may be permitted a configurable move time to reach the specified position. The third Individual Stage Time Breakdown configuration specifies shooting two targets from two positions; prior to shooting, the operator is permitted 15 seconds for setup, and 125 seconds for spotting the four targets; the operator is permitted 25 seconds for discharging each of the four shots, two shots from each of the two positions (a total of 4 minutes); prior to taking the first and third shots, the operator may be permitted a configurable move time to reach the specified positions.

Team Stage Time Breakdown configurations may correspond to a plurality of operators, whereby each operator operates a firearm and a guidance system 100 mounted to the optical instrument to the firearm. Each of the operator guidance systems 100 may be communicatively linked, as illustrated schematically in FIG. 5 with reference to guidance systems 501 and 502. Communicatively linking each of the guidance systems 100 in a Team configuration may facilitate synchronizing the selected operating mode and configurable parameters for the selected operating mode. For instance, the timers for each of the linked guidance systems 100 may be synchronized so that each operator on the team shares a common start time. In another case, one of the operator guidance systems 100 may be designated as a "master", and the remaining "slave" operator guidance systems 100 for the team may fetch configurable parameters of the selected operating mode from the "master" guidance system 100. For example, responsive to a timer start signal received from the "master" guidance system 100, a timer may be started at one or more of the "slave" guidance systems 100.

Various Team Stage Time Breakdown configurations are shown in schematic 850 where a total time parameter is configured at 6 minutes, excluding move times. The first Team Stage Time Breakdown configuration specifies shooting a single target from four different positions among two operators; prior to shooting, the two operators are permitted 15 seconds for setup, and 105 seconds for spotting the target; the first operator is permitted 30 seconds for discharging a shot from each of the 4 positions; then, the second operator is permitted 30 seconds for discharging a shot from each of the 4 positions (a total of 6 minutes); prior to taking each shot, the operators may be permitted a configurable move time to reach the new position. The second Team Stage Time Breakdown configuration specifies shooting four targets from a single position for each of two operators; prior to shooting, the operators are permitted 15 seconds for setup, and 145 seconds for spotting the four targets; the first operator is permitted 20 seconds for discharging each of the 4 shots from the single position; then, the second operator is permitted 20 seconds for discharging each of the 4 shots from the single position (a total of 6 minutes); prior to taking the first shot, each of the operators may be permitted a configurable move time to reach the specified position. The third Team Stage Time Breakdown configuration specifies shooting two targets from two positions for each of two operators; prior to shooting, the operator is permitted 15 seconds for setup, and 130 seconds for spotting the two targets; the first operator is permitted 25 seconds for discharging each of the four shots, including two shots from each of the two positions; then, the second operator is permitted 25 seconds for discharging each of the four shots, including two shots from each of the two positions (a total of 6 minutes); prior to taking the first and third shots, each of the operators may be permitted a configurable move time to reach the specified positions.

Returning to FIG. 7, responsive to selecting the NRL Hunter mode, the controller 162 may modulate the second subarray of EOIs 770 to indicate shot timing and shot counting according to the desired NRL Hunter individual and/or team configurations. As one example, the controller 162 may modulate a state of the LED elements 772, 774, and 776 to indicate a setup time, a spot time, and a move time, respectively. The controller 162 may modulate a color state of the LED elements 772, 774, and 776 to indicate a particular setup, spot, or move time elapsed, or a particular setup, spot, or move time remaining, respectively. The progression of color states at the LED elements of the subarray of EOIs 670 may provide a peripherally visible indication of how much time has elapsed or how much time remains during each shooting stage. For example, the controller 162 may modulate a color state of LED element 772 from green (G) to yellow (Y) when there are 10 seconds of setup time remaining, and from yellow (Y) to red (R) when there are 5 seconds of setup time remaining; the controller 162 may modulate a color state of LED element 774 from green (G) to yellow (Y) when there are 60 seconds of spotting time remaining, and from yellow (Y) to red (R) when there are 20 seconds of spotting time remaining; the controller 162 may modulate a state of LED element 776 analogously to indicate move time remaining. In other words, each color state change modulated by the controller 162 may indicate when a time elapsed or time remaining has crossed a particular threshold time. In another example, the controller 162 may change a blinking state frequency of LED elements 772, 774, and 776 to indicate when a time elapsed or time remaining has crossed a particular threshold time.

Subarray of EOIs 770 may further include two groups of interspersed LED elements 730 and 720. Specifically, the controller 162 may indicate each of the number of available shots by displaying blue (B) color state for the LED elements 720 (e.g., FIG. 7 shows 4 remaining available shots); the time available to the operator for discharging each of the shots is indicated by a color state of the LED elements 730 corresponding to each of the available shots indicated by LED elements 720. The total number of shots and the shot time may be set by the configurable parameters for the selected operating mode. As shown in the non-limiting example of FIG. 8, the number of shots and the timing for each shot may be determined by one or more of the number of targets, number of positions, and number of operators (e.g., team vs. individual).

Initially, a color state for the shot timer LED elements 730 may be green; when a shot timer decreases below a first threshold time, the controller 162 may responsively change a color state of the shot timer LED element 730 to orange (O); when a shot timer decreases below a second threshold time (e.g., less than the first threshold time), the controller 162 may responsively change a color state of the shot timer LED element 730 to red (R). In one example, the first threshold time may include 10 s, and the second threshold time may include 5 s. After a shot is discharged, the controller 162 may responsively change a color state of the LED element 720 corresponding to that shot from blue to OFF (or another color state). Furthermore, the controller 162 may maintain a color state of a shot timer LED element 730 corresponding to a shot, even after the shot is discharged. In this way, the second subarray of EOIs 770 provides the operator with a peripheral visual display of the available shots and the time for each available shot, according to NRL Hunter competitive shooting regulations.

As shown in Table 2, configurable parameters for the NRL Hunter operating mode include Individual vs. Team, number of targets, number of positions, total time, setup time, spot time, move time, and shot time.

TABLE 2

Configurable Parameters for NRL Hunter operating mode

| Parameter type | Description |
| --- | --- |
| Operator ID | Operator profile information (ID number, name, handedness, history) |
| Device ID | Firearm type (firearm specs), firearm wear |
| Date | Current date (year, month, day, time) |
| Individual vs. Team | Individual, Team |
| Number of shooters | Discrete (1 to upper threshold number of shooters) |
| Number of targets | Discrete (1 to upper threshold number of targets) |
| Number of positions | Discrete (1 to upper threshold number of positions) |
| Number of shots per shooter | Discrete (1 to 20 or 1 to upper threshold number of shots) |
| Setup time | Discrete time (seconds) |
| Spotting time | Discrete time (seconds) |
| Move time per position | Discrete time (seconds) |
| Time available per shot | Discrete time (seconds) |
| Level angle sensitivity | 0.2-4 degrees in 0.1 degree steps |
| Level angle mode | Bubble or ball or accelerometer |
| Recoil sensitivity | Dry fire; Small calibration, Large calibration; discrete increments of 0.1 G |

In one example, the configurable parameters may be input into the guidance system 100 by way of an operator interface displayed at the housing 110 or by way of a portable electronic device 520. In particular, navigable text based tables and/or menus may be presented at the operator interface, and configurable parameter values may be entered by way of the operator input devices 164, or by way of other input devices (e.g., touch screen, voice commands, buttons, keys, and the like) at the guidance system app 510 of the portable electronic device 520. As one non-limiting example, a graphical display similar to the schematics 800 and 850 may be presented at the guidance system app 510, whereby the operator could touch a touch screen to select and modify the desired configurable parameters.

As previously described, the guidance system 100 may store in memory any of the data received by the controller 162 from one or more of the operator input devices 164, sensors 166 on board the electronic module 160, external sensors 590, portable electronic device 520, or by way of the WWW 590. The data stored may be stored in memory at the guidance system 100 and/or at a portable electronic device 520 by way of the guidance system app 510. Furthermore, any of the data may be retrieved and displayed at an operator interface at the housing 110 or at the portable electronic device 520. In some examples, historical data may be retrieved and displayed; in other examples, real-time data may be displayed. Furthermore, displayed data may be aggregated by time, date, operator, operating mode, one or more configurable parameters of the operating mode, optical instrument type, and the like.

Figure 9A:
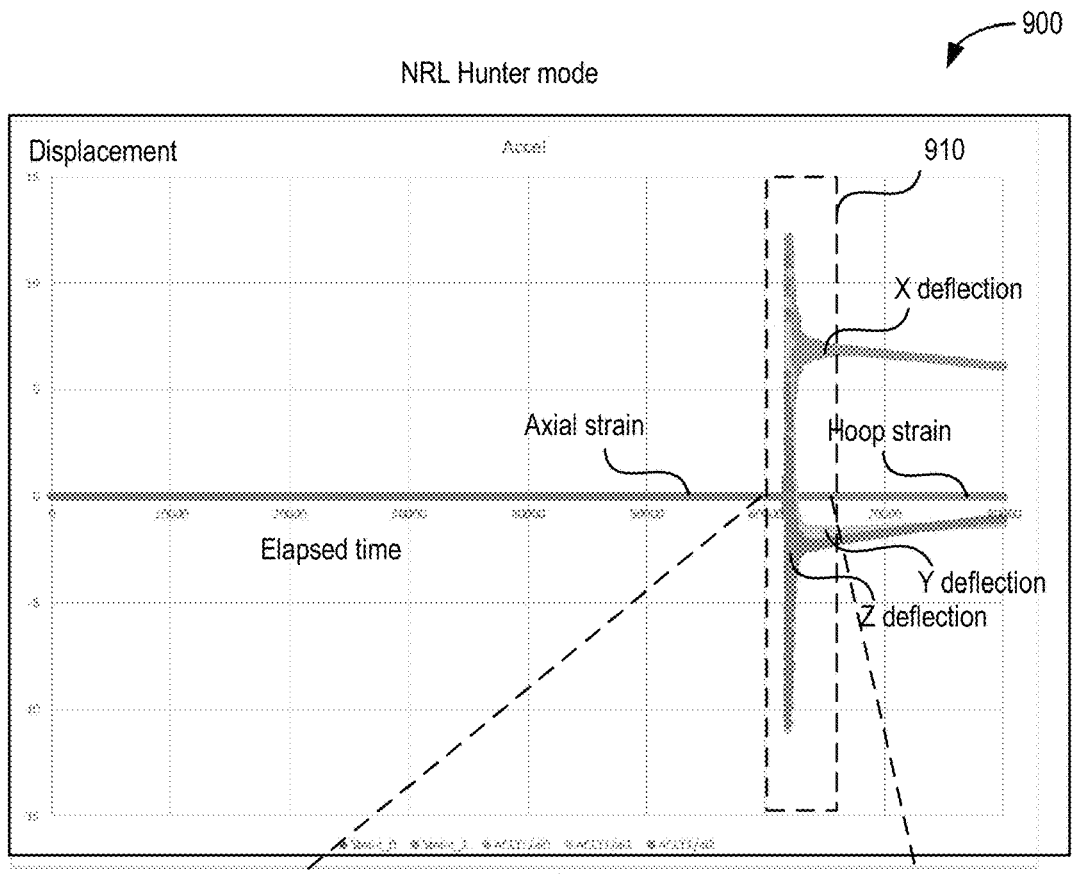
FIGS. 9A and 9B show example plots of optical instrument performance data output from the guidance system of FIG. 1, corresponding to a competitive shooting mode.
Figure 9B:
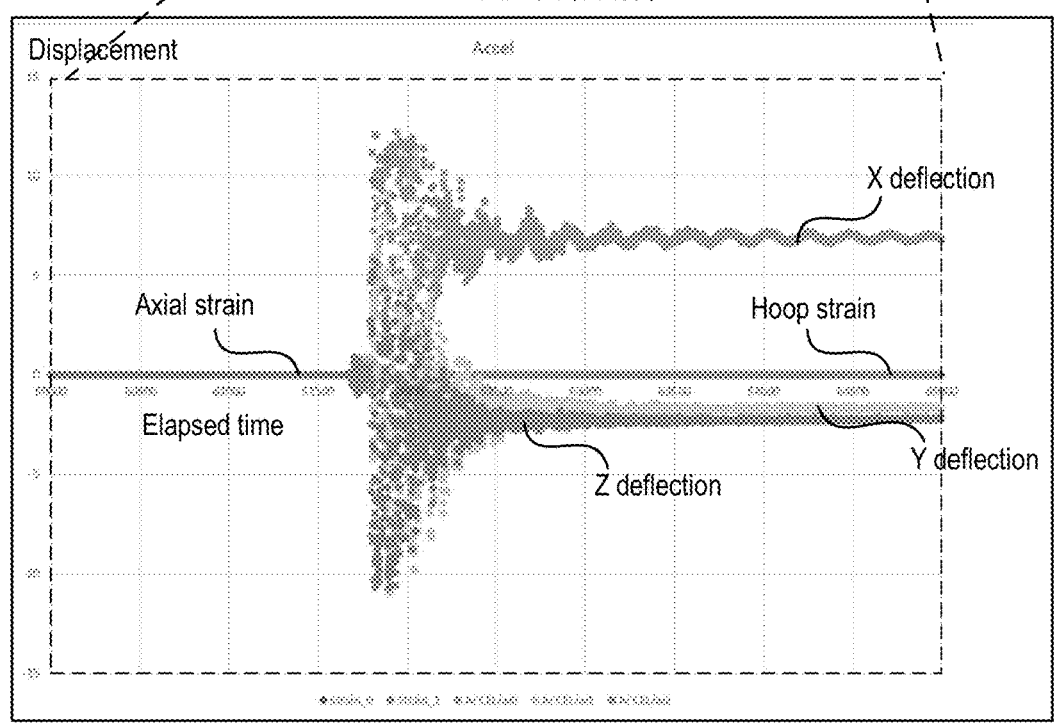

Turning now to FIGS. 9A and 9B, they show non-limiting example plots 900 and 950 displaying recoil displacement and barrel strain data following a discharged shot from a firearm for a guidance system 100 operating in a competitive shooting mode, such as the an NRL Hunter operating mode. Region 910 shown on plot 900 is magnified and shown by plot 950. Plots 900 and 950 may be displayed at one or more of an operator interface at the housing 110 or at the portable electronic device 520 responsive to input received at one or more of the operator input devices 164 and/or at the guidance system app 510 on board a portable electronic device 520. The recoil displacement, as measured by an IMU sensor 166, is broken down in to x, y, and z-axis components with elapsed time. In this way, performance data for each discharged shot may be compared. Statistical analysis tools may be available by way of the guidance system app 510 and can be leveraged to evaluate changes in operator performance based on the stored data.

Barrel strain data may be collected with the aid of an external sensor 590, such as a strain sensor positioned at a surface of the firearm barrel. Signals corresponding to the barrel axial and barrel hoop strains may be transmitted from the sensor to the electronic module 160 wirelessly to the wireless communication device 180, or by a wired connection. Collecting barrel axial and barrel hoop strain data may aid in evaluating wear and durability of the system.

Figure 10:
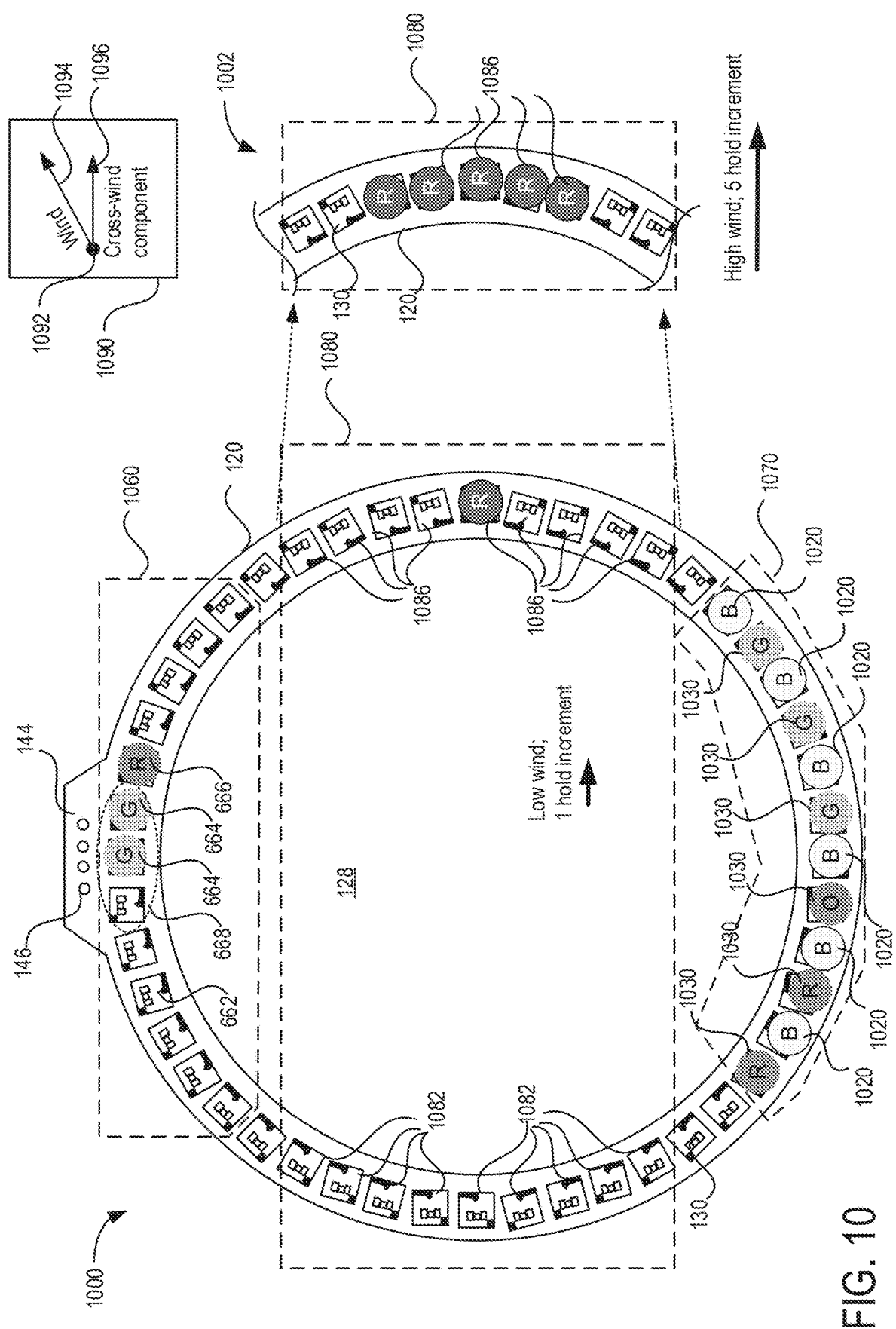
FIG. 10 shows a frontal view of an exemplary array of electronic output indicators corresponding to a competitive shooting operating mode, of the guidance system of FIG. 1.

Turning to FIG. 10, it shows another example case of modulating a state of each of the array of EOIs 130. FIG. 10 depicts an EOI assembly 1000 including a support frame 120 with an array of EOIs 130 mounted thereon. The EOI assembly 1000 may be equivalent to the EOI assemblies 600 and 700 (e.g., including equivalent number of LED elements, equivalent shape and dimensions of support frame 120), such that EOI assembly 1000 may be coupled to a housing 110, including an electronic module 160 of a guidance system 100 mounted to an eyepiece of an optical scope for a firearm. Mounting the housing 110 to the eyepiece of the optical scope may position the array of EOIs 130 at a perimeter of the eyepiece so that the array of EOIs 130 are peripherally visible to the operator of the firearm and guidance system 100 while looking through the eyepiece. In the non-limiting example of FIG. 10, an operating mode selected for the guidance system 100 corresponds to an F-Class competitive shooting mode. As described herein, the F-Class operating mode may be selected responsive to input received at one or more operator input devices 164, and the guidance system app 510 on board a portable electronic device 520.

Responsive to selecting the F-Class operating mode, the controller 162 divides the array of EOIs 130 into a first subarray of EOIs 1060, a second subarray of EOIs 1070, and a third subarray of EOIs 1080. The first subarray of EOIs 1060 and the second subarray of EOIs 1070 are each contiguous arrays of LED elements that do not overlap. The third subarray of EOIs 1080 is a discontiguous array of LED elements including a group of 9 LED elements 1082 at a left side of the array of EOIs 130 and a group of 9 LED elements 1086 at a right side of the subarray of EOIs 130.

In the non-limiting example of FIG. 10, the positioning and modulation (responsive to selecting the F-Class operating mode) of the first subarray of EOIs 1060 and the second subarray of EOIs 1070 for the F-Class operating mode are equivalent to the positioning and modulation (responsive to selecting the PRS operating mode) of the first subarray of EOIs 660 and the second subarray of EOIs 670 for the PRS operating mode, as described with reference to FIG. 6. In other words, the first subarray of EOIs 1060 may be modulated by the controller 162 to indicate a level status of the firearm, and the second subarray of EOIs 1070 may be modulated by the controller 162 to indicate a number of available shots and a timing of the available shots. In contrast to the second subarray of EOIs 660 of the PRS operating mode, the LED elements in the second subarray of EOIs 1070 are positioned at a bottom quarter portion of the array of EOIs 130, and a number of LEDs included in the second subarray of EOIs 1070 may be less than the number of LED elements included in the second subarray of EOIs 670. The LED elements 1020 may be modulated in an analogous manner to the LED elements 620 and the LED elements 1030 may be modulated in an analogous manner to the LED elements 630. Specifically, each of the number of available shots are indicated by displaying blue (B) color state for the LED elements 1020 (e.g., FIG. 10 shows 6 remaining available shots); and the time available to the operator for discharge each of the shots is indicated by a color state of the LED elements 1030 corresponding to each of the shots indicated by LED elements 1020.

In the F-Class operating mode of the guidance system 100, the controller 162 modulates the third subarray of EOIs 1080 responsive to sensor signals indicating a cross-wind component. The presence of cross-wind may cause drift of a shot discharged from a firearm in the direction of the cross-wind. In order to compensate for cross-wind, a shot may be discharged by holding or aiming the shot in the direction where the wind is coming from so that the shot trajectory drifts into the target. Graphic 1090 shows a wind vector 1094 representing a direction and magnitude of a wind, a direction of the firearm 1092 (e.g., represented as pointing into the page), and a cross-wind component vector 1096 representing a direction and magnitude of a cross-wind component in a horizontal direction perpendicular to the direction of the firearm 1092. The cross-wind component is equivalent to a projection of the wind vector 1094 in the cross-wind direction (e.g., the horizontal direction perpendicular to the direction of the firearm 1092). In one example, real-time cross-wind magnitude and direction data may be obtained from an external sensor 590 such as a wind meter. In one example, the wind meter may be in wireless communication with the electronic module 160 by way of the wireless communication device 180. In another example, the wind meter may be in wireless communication by way of a guidance system app 510 residing on board a portable electronic device 520 in wireless communication with the electronic module 160. In other examples, the real-time cross-wind magnitude and direction data may be obtained from the WWW (e.g., weather application, GPS application, and the like) accessible by wireless communication to and from a portable electronic device 520. The source of the wind data may be set by the operator by way of configurable parameters for the F-Class operating mode (see Table 3).

In the example of FIG. 10, responsive to sensor signals indicating a non-zero cross-wind component, the controller 162 changes a color state of one or more of the LED elements in the subarray of EOIs 1080 to indicate a direction and magnitude of a hold or aim compensation. In the case of EOI assembly 1000, responsive to one or more signals from a wind meter indicating a low cross-wind blowing towards the left, the controller 162 modulates one of the LED elements 1086 at the right side of the array of EOIs 130 to indicate a one hold increment (to compensate for the measured cross-wind). The hold increment may be an operator-configurable parameter for the F-Class operating mode. In one example, each hold increment may correspond to a threshold hold increment measured in minutes of angle (MOA) or mph cross-wind speed/0.1 mil. The higher the cross-wind speed, the higher the number of hold increments; that is, at higher the cross-wind speeds, the greater the compensation for cross-wind (e.g., the greater the number of hold increments). Accordingly, as depicted in the partial EOI assembly 1002, responsive to a signal from the wind meter indicating a high cross-wind to the left, the controller 162 modulates the color state of five LED elements 1086 to indicate five hold increments (to compensate for the measured cross-wind. In this way, the second subarray of EOIs 1070 provides the operator with a peripheral visual display of the cross-wind compensation of the firearm, according to F-Class competitive shooting regulations.

As shown in Table 3, non-limiting examples of configurable parameters for the F-Class operating mode include operator ID, firearm device ID, number of shots available, time available per shot, level angle sensitivity, level angle mode, and hold increment threshold, number of positions, total time, setup time, spot time, move time, and shot time. As indicated in Table 3, the hold increment may also be a function of LED color state, whereby the controller 162 may modulate the LED elements 1086 to a different LED color state depending on the magnitude of the threshold hold increment. For example, red may correspond to a first threshold hold increment per red LED element 1086, and yellow may correspond to a second threshold hold increment per yellow LED element 1086, where the first and second threshold hold increments are unequal. During the F-Class operating mode, shot times for each available shot may be longer and measured in minute increments.

TABLE 3

Configurable Parameters for F-Class operating mode

| Parameter type | Description |
| --- | --- |
| Operator ID | Operator profile information (ID number, name, handedness, history) |
| Device ID | Firearm type (firearm specs), firearm wear |
| Date | Current date (year, month, day, time) |
| Number of shots | Discrete (1 to 20 or 1 to upper threshold number) |
| Time available per shot | Discrete time (minutes) |
| Level angle sensitivity | 0.2-4 degrees in 0.1 degree steps |
| Level angle mode | Bubble or ball or accelerometer |
| Wind data source | External sensor, WWW, Portable electronic device |
| Hold increments threshold | Hold increment per LED corresponding to a color state |

Figure 11:
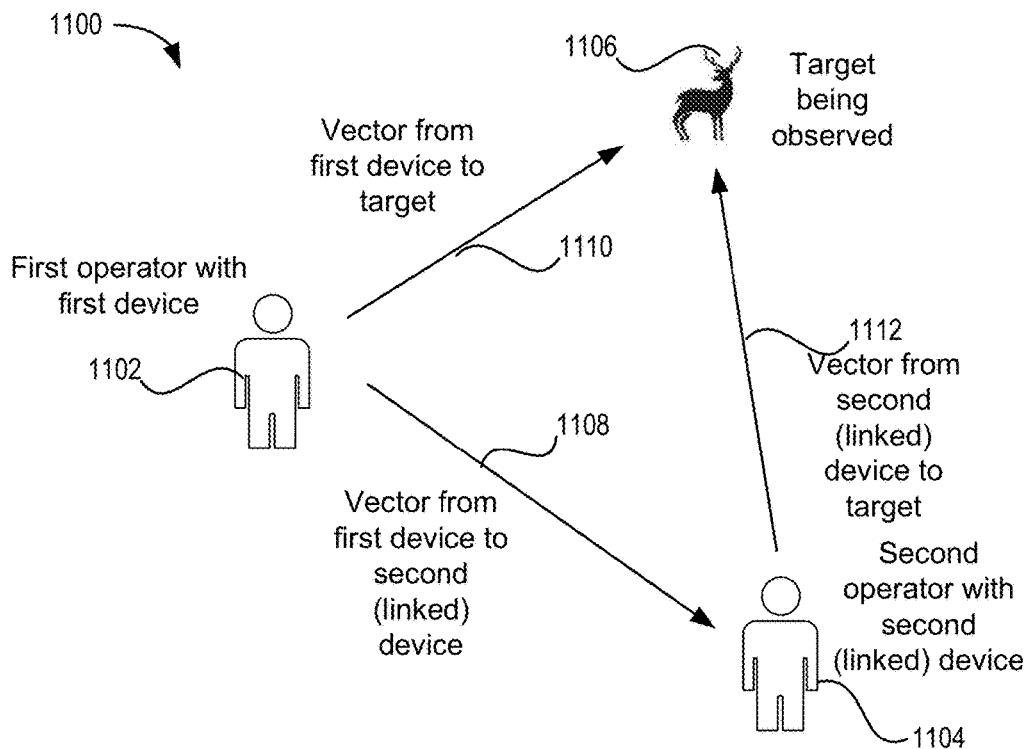
FIG. 11 shows a schematic of an example of Target Spotting with a plurality of guidance systems.
Figure 12:
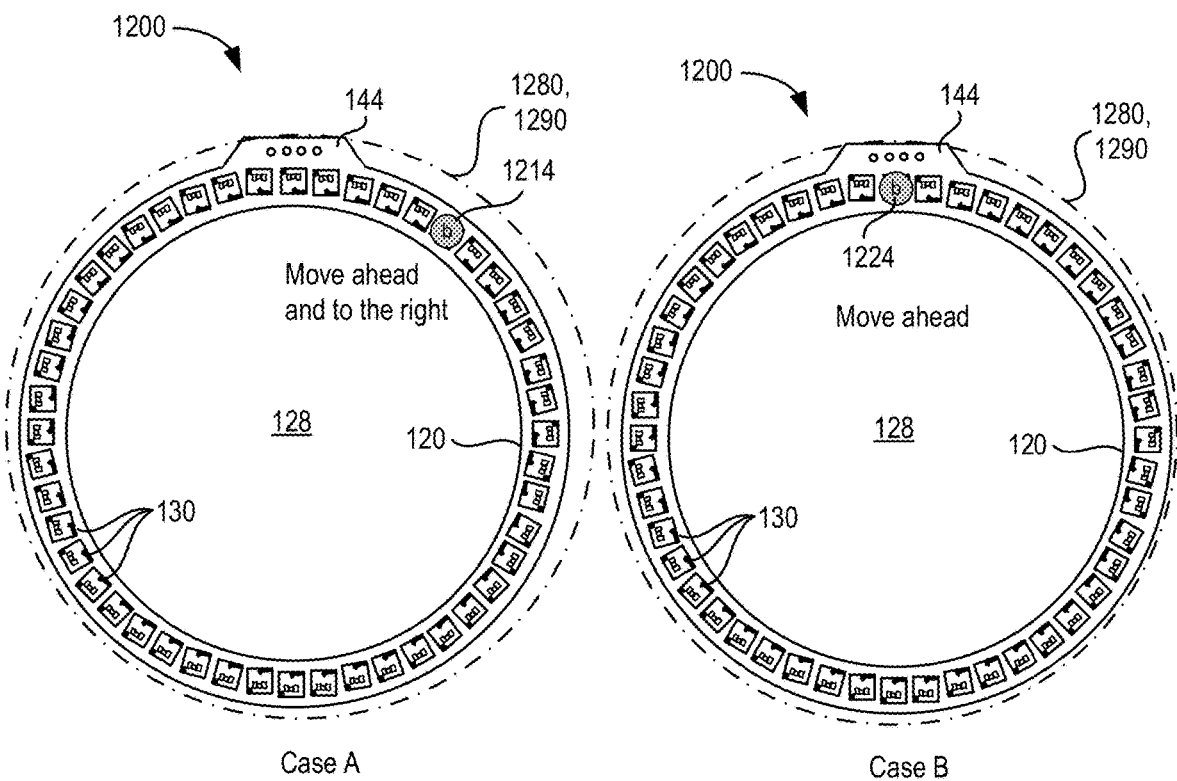
FIG. 12 shows a frontal view of an exemplary array of electronic output indicators corresponding to a Target Spotting operating mode, of the guidance system of FIG. 1.
Figure 13:
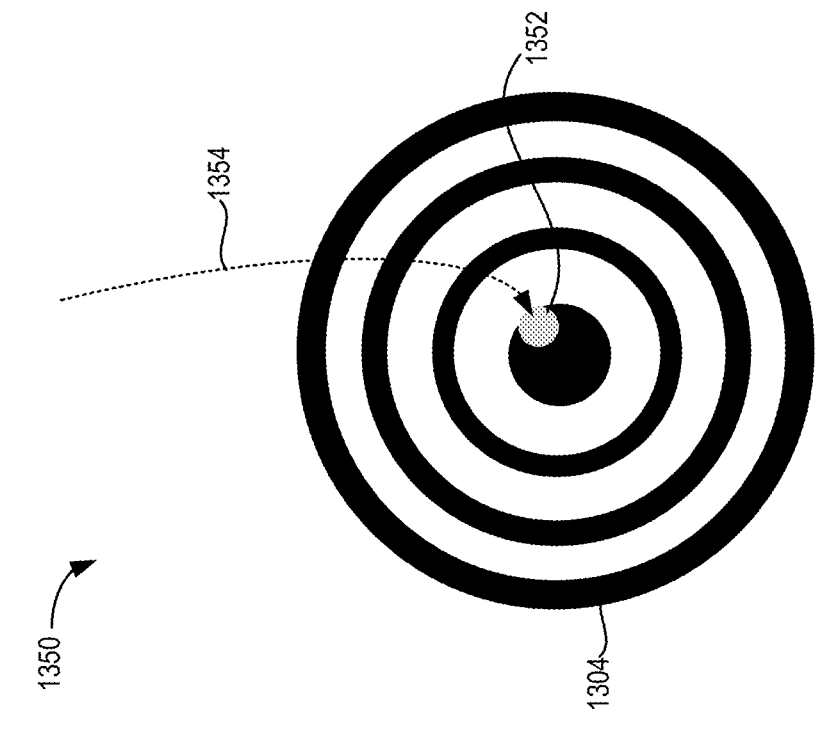
FIG. 13 illustrates an example of historical performance data output from the guidance system of FIG. 1, corresponding to a competitive shooting mode.
Figure 13:
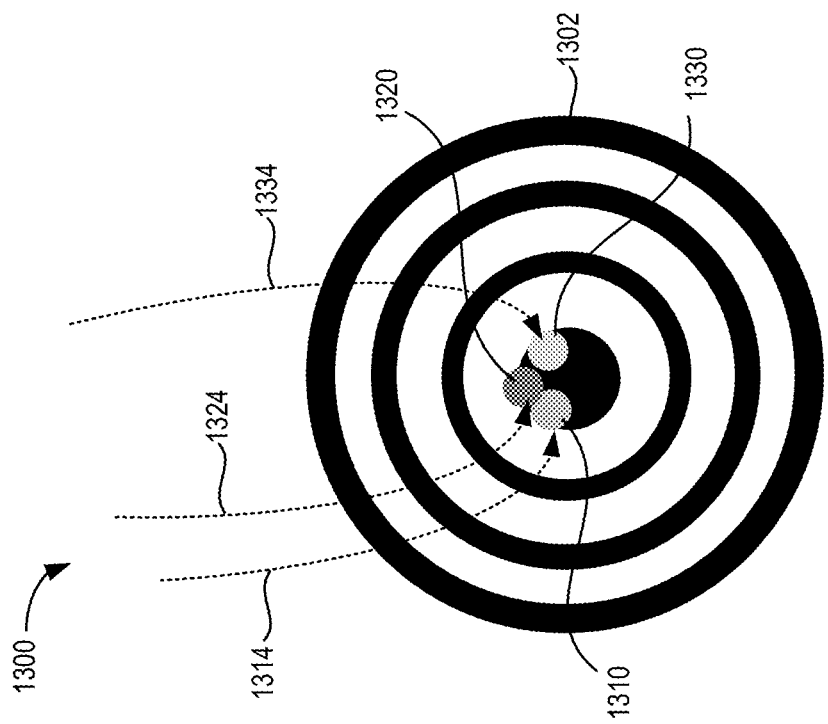

Turning now to FIGS. 11 and 12, they illustrate a Target Spotting operating mode of the guidance system 100. As examples, multiple guidance systems 100 may each be mounted to a separate optical instrument such as binoculars or a scope of a firearm, wherein the array of EOIs 130 is positioned peripherally to an eyepiece without obstructing a field of view of the operator looks through the eyepiece of the optical instrument. Schematic 1100 illustrates the spotting methodology. A first operator 1102 with a first device (e.g., in FIG. 11, device refers to a guidance system 100 mounted to a first optical instrument such as binoculars or a scope) and a second operator 1104 with a second device linked to the first device are observing a target 1106. A position of the first operator 1102 (with the first device) and a position of the second operator 1104 (with the second (linked) device) are related by a displacement vector 1108. Similarly, a displacement vector 1110 relates the positions of the target 1120 and the first operator, and a displacement vector 1112 relates the positions of the target 1120 and the second operator. Knowing two of the three displacement vectors 1108, 1110, and 1112, as well as the positions of two of the first operator 1102, second operator 1104, and target 1106, the remaining vector and position can be determined by triangulation.

During the Target Spotting operating mode, a first guidance system 100 is mounted to a first optical instrument and is paired with a second guidance system 100 mounted to a second optical instrument. Pairing between the first and second guidance systems 100 may include, but is not limited to, real-time synchronization therebetween with respect to configurable parameters of the Target Spotting operating mode; furthermore, operator input at one of the first and second guidance systems may be received simultaneously at both first and second guidance systems; further still, sensor signals may be transmitted to both the first and second guidance systems simultaneously; further still, data and executable commands may be transmitted from the first guidance system to the second guidance system, and vice versa; further still, further still the first and second guidance systems are in wireless communication with each other.

A position of the first operator 1102 and/or the second operator may be determined, for example, from a GPS sensor on board the electronic module 160, an external sensor 590, or a portable electronic device 520 (with the guidance system app 510) in wireless communication guidance system 100 attached to the first and second devices, respectively. At the first or second (linked) device, the controller 162 may calculate displacement vector 1108 responsive to receiving operator input by way of an operator input device 164 (e.g. depressing a range finder button on the housing 110) while aiming the first device at the second (linked) device (or vice versa). The controller 162 may then wirelessly transmit the displacement vector 1108 from the first device to the second (linked) device (or vice versa). The controller 162 may calculate displacement vector 1110 responsive to receiving operator input by way of an operator input device 164 (e.g. depressing a range finder button on the housing 110) while aiming the first device at the target. Responsive to determining the displacement vectors 1108 and 1110, the controller 162 may calculate (e.g., by triangulation) the displacement vector 1112. Responsive to calculating the displacement vector 1112, at the first device, the controller 162 wirelessly transmits the displacement vector 1112 from the first device to the second (linked) device. At the second (linked) device, responsive to receiving the displacement vector 1112, the controller 1612 modulates one or more of the array of EOIs 130 at the second (linked) device to indicate a direction and range from the second operator 1104 to the target 1106.

Furthermore, in some examples the target 1106 may be a non-stationary target, such as an animal or locomotive vehicle, that has a variable position with time. Additionally, one or more of the position of the first operator 1102 and the position of the second operator 1104 may change with time as the operators attempt to follow the target 1106. As such, calculation of the displacement vectors 1108, 1110, and 1112 may be dynamic and continually changing with time. For the case when a position of one or more of the target 1106, first operator 1102, and second operator 1104 changes quickly, the change in the displacement vectors 1108, 1110, and 1112 may also change quickly.

Turning to FIG. 12, it shows another example case of modulating a state of each of the array of EOIs 130. FIG. 12 depicts an EOI assemblies 1200, including a support frame 120 with an array of EOIs 130 mounted thereon. The EOI assembly 1200 may be equivalent to the EOI assembly 600 (e.g., including equivalent number of LED elements, equivalent shape and dimensions of support frame 120), such that EOI assembly 1200 may be coupled to a housing 110, including an electronic module 160 of a guidance system 100 mounted to an eyepiece of an optical scope for a firearm.

Mounting the housing 110 to the eyepiece of the optical scope may position the array of EOIs 130 at a perimeter of the eyepiece so that the array of EOIs 130 are peripherally visible to the operator of the firearm and guidance system 100 while looking through the eyepiece. In the non-limiting example of FIG. 12, an operating mode selected for the guidance system 100 corresponds to a Target Spotting operator mode. As described herein, the Target Spotting operating mode may be selected responsive to input received at one or more operator input devices 164, and the guidance system app 510 on board a portable electronic device 520. Responsive to selecting the Target Spotting operating mode, the controller 162 may divide the array of EOIs 130 into a plurality of subarrays, including a first subarray of EOIs 1280 and a second subarray of EOIs 1290. The first subarray of EOIs 1280 is a contiguous array of LED elements that overlaps with the subarray of EOIs 1290. In the example of FIG. 12, the first subarray of EOIs 1280 and the second subarray of EOIs 1290 both include all of the LED elements in the array of EOIs 130.

During the Target Spotting operating mode, the controller 162 may calculate and display one or more of displacement vectors 1108, 1110, and 1112. For example, responsive to receiving operator input by way of an operator input device 164 (e.g. depressing a range finder button on the housing 110) while aiming the first device at the second (linked) device (or vice versa), the controller 162 may modulate a state of one of the LED elements in the subarray of EOIs 1280 to indicate a bearing in the direction of the displacement vector 1108 relative to the first operator (or second operator). In another example, responsive to determining the displacement vectors 1108 and 1110, the controller 162 may calculate (e.g., by triangulation) the displacement vector 1112 at the first device (or the second (linked) device); responsive to receiving the calculated displacement vector 1112 at the second (linked) device (or the first device), the controller 1612 at the second (linked) device (or the first device) modulates a state of one of the subarray of EOIs 1280 at the second (linked) device (or the first device) to indicate a bearing in the direction of the displacement vector from the second operator 1104 (or the first operator 1102) to the target 1106. Because all of the array of EOIs 130 are included in the first subarray of EOIs 1280, all possible directions (e.g. 360 degrees relative to the eyepiece and field of view of the operator) may be accurately indicated. Because all of the array of EOIs 130 are included in the first subarray of EOIs 1280, all possible directions (e.g. 360 degrees relative to the eyepiece and field of view of the operator) may be accurately indicated.

In the example of FIG. 12, Case A (left) depicts a blinking (b) LED element 1214 modulated ON with a blue color state to indicate a bearing ahead and to the right, while Case B (right) depicts a blinking (b) LED element 1224 modulated ON with a blue color state to indicate a bearing straight ahead. In other words, the blinking LED elements 1214 and 1224 indicate a direction of motion matching the direction of the displacement vector indicated. Furthermore, the controller 162 may further modulate a blink frequency state of the LED elements in the subarray of EOIs 1280 based on a rate of change in the displacement vector. In particular, if a velocity of one or more of the target 1106, first operator 1102, and second operator 1104 is higher, then a rate of change in one or more of the displacement vectors 1108, 1110, and 1112 may be higher; accordingly, during these conditions the controller 162 may modulate a blink frequency state of the LED elements in the subarray of EOIs 1280 to be higher. Further still, responsive to when a bearing of the optical instrument matches a desired orientation (e.g., matches the displacement vector), the controller 162 may modulate a state of all the LED elements in the subarray of EOIs 1280 to blink twice.

The blinking frequency and color state of the LED element with respect to a rate of change of the position of one or more of the target 1106, first operator 1102, and second operator 1104 may be configurable parameters of the Target Spotting operating mode. In this way, the first subarray of EOIs 1280 provides the operator with a peripheral visual display of Spotting status (e.g., orientation or bearing of the optical instrument relative to an observed target), according to the Target Spotting operator mode.

During the Target Spotting operating mode, the second subarray of EOIs 1290 indicates when an orientation (e.g., bearing, aim) of the optical instrument matches the direction of the displacement vector 1112. One or more of an IMU sensor 166, digital compass sensor, and a GPS sensor may be used to determine a bearing of the optical instrument. These sensors may be positioned on board the electronic module or on board a portable electronic device 520, or may be an external sensor 590 in communication with the electronic module 160. Responsive to receiving a signal from one of these sensors indicating that a bearing of the optical instrument matches the direction of displacement vector 1112, the controller 162 may modulate a flashing state of all of the LED elements in the subarray of EOIs 1290. Synchronized flashing of all of the LED elements in the subarray of EOIs 1290 indicates to the operator that the optical instrument has the desired bearing (e.g., the optical instrument is aimed at the target). The synchronized flashing may be executed for a threshold number of flashes, or for a threshold flashing duration. Furthermore different flashing colors may be flashed to indicate when a bearing of the optical instrument is within various thresholds of the direction of the displacement vector. For example, responsive to the bearing of the optical instrument being within a first threshold vector difference of the desired displacement vector, the controller 162 may change a color state of all the LED elements in the subarray of EOIs 1290 to red; and responsive to the bearing of the optical instrument being within a second threshold vector difference of the desired displacement vector, the controller 162 may change a color state of all the LED elements in the subarray of EOIs 1290 to yellow. The threshold number of flashes, the threshold flashing duration, the threshold flashing colors, and the threshold vector differences may each be configurable parameters of the Target Spotting operator mode. In this way, the first subarray of EOIs 1280 provides the operator with a peripheral visual display of Spotting status (e.g., orientation or bearing of the optical instrument relative to an observed target), according to the Target Spotting operator mode.

The configurable parameters of the Target Spotting operating mode of the guidance system 100 are configurable by way of the operator input devices 164 and/or the guidance system app 510. The selected operating mode, configurable parameter values, and performance data may all be stored in memory at the electronic module 160 and/or the guidance system app 510 on board the portable electronic device 520. These configurable parameters may be synchronized at the guidance system 100 of the first operator 1102 and the guidance system of the second operator 1104. Non-limiting examples of configurable parameters for the Target Spotting operating mode are shown in Table 4:

TABLE 4

Configurable Parameters for Target Spotting operating mode

| Parameter type | Description |
| --- | --- |
| Operator ID | Operator profile information (ID number, name, age, address) |
| (First) Device ID | Device type, manufacturer, model, serial number |
| Second (linked) device ID | Device type, manufacturer, model, serial number |
| Date | Current date (year, month, day, time) |
| Target type | Stationary, non-stationary, animal, etc. |
| Color state | Blue, Red, Green, Yellow |
| Blinking frequency range | Lower frequency threshold, upper frequency threshold |
| Threshold flashing | Number of flashes, flashing duration, flashing color |
| Threshold vector difference | Number of threshold vector differences, values of threshold vector differences, color corresponding to threshold vector difference |

The operator identification (ID) parameters may include data related to an operator's personal profile such as an operator ID number, name, address, age, and the like; the device ID parameters may include a device type, first and second (linked) device specifications (e.g., make and model, manufacturer, serial number). The date parameters may include current year, month, day and time, including a duration, associated with utilization of the guidance system 100. The target type may refer to a stationary or non-stationary target, animal, human, bird, and the like; the color state may be selected by the operator for indicating a displacement vector bearing. A blinking frequency range may be configured from a lower frequency threshold to an upper frequency threshold corresponding to a range between a lower rate of change and upper rate of change of the calculated displacement vector.

FIGS. 6, 7, 10, and 12 demonstrate how a single guidance system 100 can be configured to execute a plurality of operating modes while mounted to the same optical instrument. In particular, the EOI array is reconfigured for each of the plurality of operating modes, including for each operating mode, dividing the EOI array 130 into a different plurality of EOI subarrays, and modulating each of the EOI subarrays responsive to a different set of signals received at the controller 162. Furthermore, the same EOI assembly, including the same support frame 120, is utilized for executing each of the plurality of operating modes. In the non-limiting example of FIGS. 6, 7, 10, and 12, the guidance system 100 is mounted to a scope of a competitive shooting firearm. While maintaining the guidance system 100 mounted to the firearm, the guidance system may execute each of a PRS, NRL Hunter, F-Class, and Target Spotting operating modes. In other words, the guidance system 100 switches between each of the PRS, NRL Hunter, F-Class, and Target Spotting operating modes without mounting the guidance system 100 to a different firearm scope, and without mounting a different guidance system to the firearm scope.

Selection of and switching between each of the plurality of operating modes changes a configuration of the subarray of EOIs and how each EOI is modulated responsive to one or more sets sensor signals. Furthermore for each different operating mode, the array of EOIs is divided and reconfigured into a different plurality of subarrays. Each of the EOI array reconfigurations may differ by one or more of a number of subarrays, the number of EOIs in each subarray, and how the states of each element of each subarray is modulated responsive to the signals from one or more sensors. In particular, the controller 162 modulates each of the EOIs in the plurality of subarrays of EOIs responsive to a different set of signals, according to the selected operating system. Selection of and switching between each of the plurality of operating modes may be responsive to operator input at one or more of the guidance system 100 and a portable electronic device 520. Execution of the Target Spotting operating mode includes sending and receiving sensor signals and data, by way of wireless communication, between two separate guidance systems 100, wherein each of the two guidance systems is mounted to a different firearm scope.

In this manner, a guidance system mountable to an optical instrument include an electronic output indicator (EOI) array, the EOI array positioned at a perimeter of an eyepiece of the optical instrument upon mounting the guidance system to the optical instrument, and a controller, wherein, while the guidance system is mounted to the optical instrument, the controller includes executable instructions stored in non-transitory memory thereon to, execute a plurality of operating modes, including, for each operating mode, dividing the EOI array into a different plurality of EOI subarrays, and modulating each of the plurality of EOI subarrays responsive to a different set of one or more sensor signals. In a first example, the guidance system further includes, while the guidance system is mounted to the optical instrument, the executable instructions further include, switching between different operating modes. In a second example, optionally including the first example, the guidance system further includes, while the guidance system is mounted to the optical instrument, the executable instructions to switch between the different operating modes is performed in response to operator input received at the guidance system. In a third example, optionally including one or both of the first and second examples, the optical instrument further includes a scope for a firearm, and the plurality of operating modes includes two or more different competitive shooting modes. In a fourth example, optionally including one or more of the first through third examples, the plurality of operating modes includes a target spotting mode, wherein during operation of the target spotting mode, the guidance system is in wireless communication with another guidance system, the other guidance system being identical to the guidance system, except for the other guidance system being mountable to a different optical instrument. In a fifth example, optionally including one or more of the first through fourth examples, the guidance system further includes, while the guidance system is mounted to the optical instrument, the controller is in wireless communication with a portable electronic device and the controller further includes executable instructions stored in non-transitory memory on board the portable electronic device to, transmit the one or more sensor signals from the portable electronic device to the controller. In a sixth example, optionally including one or more of the first through fifth examples, the guidance system further includes, while the guidance system is mounted to the optical instrument, the portable electronic device includes an internet connection, and the one or more sensor signals are received at the portable electronic device by way of the internet connection.

In this manner, a guidance system for an optical instrument includes a housing mountable to the optical instrument, an array of electronic output indicators (EOIs), one or more sensors, and a controller, wherein mounting the housing to the optical instrument positions each of the array of EOIs at a perimeter of an eyepiece of the optical instrument, and while each of the array of EOIs are positioned at the perimeter of the eyepiece, the controller includes executable instructions stored in non-transitory memory thereon to, execute a plurality of operating modes, including, for each operating mode, dividing the array of EOIs into a different plurality of EOI subarrays, and modulating each of the plurality of EOI subarrays responsive to a different set of signals from the one or more sensors. In a first example, the guidance system includes, while each of the array of EOIs are positioned at the perimeter of the eyepiece, each of the array of EOIs are positioned at the perimeter of the eyepiece without obstructing a field of view of the eyepiece. In a second example, optionally including the first example, the guidance system further includes, while each of the array of EOIs are positioned at the perimeter of the eyepiece, each of the array of EOIs are only peripherally visible while viewing the field of view through the eyepiece. In a third example, optionally including one or both of the first and second examples, the guidance system further includes, wherein the one or more sensors includes an inertial measurement unit (IMU) sensor. In a third example, optionally including one or both of the first and second examples, the guidance system further includes, while each of the array of EOIs are positioned at the perimeter of the eyepiece, the executable instructions to switch from one to a different of the plurality of operating modes is in response to operator input received at a portable electronic device in wireless communication with the controller.

Turning now to FIG. 14, it illustrates an example of a method 1400 of operating a guidance system 100 mounted to an optical instrument. Method 1400 includes executable instructions residing in non-transitory memory on board one or more of the controller 162 and the portable electronic device 520. Method 1400 begins at 1408 where the housing is coupled to the EOI assembly; the EOI assembly includes the support frame 120 and the array of EOIs 130. The EOI assembly may be coupled to the housing 110 by way of a coupling 140 positioned between the housing 110 and the EOI assembly. In some examples, the coupling 140 may include an adjustable coupling so that the support frame 120 may be repositioned relative to the housing 110, including while the mountable surface 112 is fixedly mounted to the optical instrument.

Method 1400 continues at 1410 where a housing 110 of the guidance system 100 if mounted to an optical instrument. As described herein with reference to FIG. 1, as non-limiting examples, the optical instrument may include a scope for a firearm, binoculars, a telescope, or a camera. Mounting the housing 110 may include mounting a mountable surface 112 of the housing 110 to the optical instrument. In one example, mounting the housing may include detachably mounting the housing 110 to the optical instrument, whereby the mountable surface 112 includes a detachable mounting surface that is not integrated with a bottom surface of the housing 110, but that is detachably mountable to a bottom surface of the housing 110 and detachably mountable to the optical instrument. As such, the housing 110 may be flexibly and interchangeably mountable to a range of optical instrument sizes, shapes, and types by selecting an appropriate adjustable mounting surface 112 that fits and is mountable fixedly the optical instrument.

Method 1400 continues at 1416 (indicated by the dotted box), whereby one or more of a plurality of steps 1420 through 1464 may be executed while the guidance system 100 is mounted to the optical instrument. In embodiments where the electronic module 160 communicates wirelessly with the array of EOIs 130, and the electronic module 160 is positioned remotely from the optical instrument at a portable electronic device, one or more of the plurality of steps 1420 through 1464 may be executed while the guidance system 100 is mounted to the optical instrument, wherein while the guidance system 100 is mounted to the optical instrument includes, while the EOI assembly is mounted to the optical instrument and while the housing 110 and electronic module 160 are not mounted to the optical instrument.

Method 1400 proceeds to 1420 where the array of EOIs 130 is positioned at a perimeter of the eyepiece of the optical instrument. In one example, mounting the mountable surface 112 of the housing 110 to the optical instrument may facilitate positioning of the array of EOIs 130 at the perimeter of the eyepiece of the optical instrument. Furthermore, positioning the array of EOIs 130 at the perimeter of the eyepiece allows for the array of EOIs 130 to be peripherally visible to the operator without obstructing a field of view of the optical instrument when the operator is looking through the eyepiece. In cases where the EOI assembly is coupled to the housing 110 with a coupling 140 that is adjustable, positioning the array of EOIs 130 at the perimeter of the eyepiece may include adjusting a position of the coupling 140. Furthermore, in cases where a support frame 120 may be detachable from the coupling 140, positioning the array of EOIs 130 at the perimeter of the eyepiece may include selecting a support frame 120 with a size and shape that matches the size and shape, respectively, of the eyepiece.

Next, method 1400 continues at 1430 where an operating mode for the guidance system 100 is selected. Selecting the operating mode of the guidance system may be performed by the operator by way of one or more of the operator input devices 164, an operator interface mounted at the housing 110, and an operator interface for the guidance system app 510 installed on board a portable electronic device 520. In one example, the selected operating modes may include operating modes for a guidance system 100 mounted to a scope of a firearm, such as PRS, NRL Hunter, and F-Class competitive shooting modes, and a Target Spotting operating mode, as described herein with reference to FIGS. 6, 7, 10, and 12.

Method 1400 continues at 1440 where the controller 162 executes a set of instructions responsive to receiving operator input as to the selected operating mode. At 1442, the controller 162 obtains the configurable parameter values corresponding to the selected operating mode. As shown in Table 1-4, each operating mode of the guidance system 100 may have a different set of configurable parameters. One or more of the configurable parameters may be common to each operating mode, such as operator ID, device ID, and date. In contrast other configurable parameters may be different for different operating modes. Values for the configurable parameters may be obtained by the controller 162 by prompting for operator input at an operator interface of the guidance system 100 or a portable electronic device 520. In another example, values for the configurable parameters may be automatically loaded from preset templates stored in memory on board the guidance system 100 or the portable electronic device 520. For example, knowing a user ID and a device ID, the controller 162 may load preset values for the remaining configurable parameter values for the selected operating mode. In another example, some of the configurable parameter values may be obtained by operator input, while others may be obtained my loading stored values from memory. In another example, an operator may modify a configurable parameter value while operating the guidance system 100.

At 1444, responsive to the selected operating mode, the controller 162 divides the array of EOIs 130 into a plurality of subarrays of EOIs. Each of the subarrays of EOIs may be independently configurable to be modulated responsive to a different set of signals from the one or more sensors of the guidance system 100, external sensors 590, and the portable electronic device 520. Furthermore, the subarrays of EOIs may be contiguous arrays of EOIs or may be discontiguous arrays of EOIs. Further still, the subarrays of EOIs may overlap whereby one or more of the EOIs exhibit multiplicity with respect to their modulation being responsive to a plurality of different sets of sensor signals. Furthermore, these EOIs may exhibit multiplicity with respect to their modulation being simultaneously responsive to a plurality of different sets of sensor signals.

At 1446, the controller 162 modulates the EOI states of each of the subarrays of EOIs according to a different set of sensor signals received thereat. As described herein, the configurable parameters may modify how the controller 162 modulates the EOI states of each of the subarrays of EOIs by defining threshold values, ranges, durations, blink frequencies, and the like, associated with modulation of the subarrays of EOIs. The configurable parameters may allow an operator to customize the output states of the subarrays of EOIs. Thus, the subarrays of EOIs may each be distinct, each having a different one or more of a number of EOI elements, a different position or arrangement of EOI elements, and a different way of modulating the EOI elements responsive to the set of one or more sensor signals.

Next, at 1450, the controller 162 determines if a different operating mode is selected. During operation of the guidance system 100, the operator may decide to select a different operating mode. Selecting a different operating mode may include quitting a current operating mode prior to selecting the new operating mode. Selecting the different operating mode may be determined by the controller 162 responsive to operator input received at one or more of the operator input devices 164, an operator interface displayed at the housing 110, and an operator interface of the portable electronic device 520. Responsive to selecting a different operating mode, the method 1400 continues at 1452 where the controller 162 stops modulating the state of each of the arrays of EOIs, and stores all current performance data. Next, method 1400 returns to 1440 of method 1400 to configure the new operating mode. Thus, the same guidance system 100 may be advantageously operated over a range of operating modes. Furthermore the guidance system 100 allows for switching between different operating modes while the guidance system is fixedly mounted to one optical instrument. In particular, the controller 162 can adapt the one guidance system 100 to each different operating mode by reconfiguring the array of EOIs 130 corresponding to the each different operating mode.

For the case where a different operating mode is not selected at 1450, method 1400 continues at 1456 where the controller 162 determines if the support frame 120 is to be changed. The support frame 120 may include a detachable support frame. Thus changing the support frame 120 may include detaching the support frame 120 from one or more of the coupling 140, the housing 110, and the eyepiece of the optical instrument. The controller 162 may determine that the support frame 120 is to be changed responsive to receiving operator input at one or more of an operator interface at the housing 110 and the portable electronic device 520. Next, method 1400 continues at 1458 where the controller 162 stops modulating the states of the array of EOIs according to the selected operating mode and stores all current data associated with the selected operating mode prior to detaching the support frame from the optical instrument. After detaching the support frame from the optical instrument, method 1400 continues at 1420, where a different support frame 120 is selected and attached to the coupling 140.

For the case where a support frame 120 is not changed at 1456, method 1400 continues at 1460 where the controller 162 determines if the optical instrument is to be changed. Determining that the optical instrument is to be changed may be responsive to operator input received at one or more of an operator interface at the housing 110 and the portable electronic device 520. Changing the optical instrument may include detaching the housing of the guidance system 100 from the optical instrument and remounting the housing to a different optical instrument. Changing the optical instrument while the guidance system 100 is operating (e.g., the guidance system 100 status is powered ON) may be initiated by operator input received at one or more of the operator interface at the housing 110 and the portable electronic device 520. Responsive to selecting a different optical instrument, the method 1400 continues at 1462 where the controller 162 stops modulating the state of each of the arrays of EOIs, and stores all current performance data. Method 1400 continues at 1464 where the guidance system 100 is unmounted from the optical instrument. Unmounting the guidance system 100 from the optical instrument may include one or more of separating a detachable mountable surface 112 from the optical instrument and separating a detachable mountable support frame 120 from the eyepiece of the optical instrument. Next, method 1400 returns to 1408 of method 1400.

Thus, the same guidance system 100 may be advantageously adapted for use with different optical instruments. Because the guidance system 100 is not permanently integrated with or built-in to a particular optical instrument, and because the EOI assembly can be reconfigured for different optical instruments by selecting a different operating mode, the guidance system 100 may advantageously be adapted to various different types of optical instruments. Furthermore, as alluded to herein with reference to 1108, for the case where the guidance system 100 includes a detachable mountable surface 1412 and/or a detachable adjustable coupling 140, the housing 110 may be mounted to a broad range of optical instrument (and eyepiece) sizes and shapes by selecting the appropriate detachable mountable surface and/or detachable mountable support frame. Further still, as alluded to herein with reference to 1410, for the case where the guidance system 100 includes an adjustable (and detachable) coupling 140, a position of the array of EOIs 130 may be adjusted and fitted to precisely position the array of EOIs 130 at a perimeter of an eyepiece of various different optical instruments. In some examples, the detachable adjustable coupling allows for changing the EOI assembly to a different EOI assembly that may be more suited to fitting a particular optical instrument. For the case where a different optical instrument is not selected at 1460, method 1400 ends.

In this manner, a method of operating a guidance system mountable to an optical instrument includes positioning an electronic output indicator (EOI) array at a perimeter of an eyepiece of the optical instrument upon mounting the guidance system to the optical instrument, wherein, while the guidance system is mounted to the optical instrument, executing a plurality of operating modes, including, for each operating mode, dividing the EOI array into a different plurality of EOI subarrays, and modulating each of the plurality of EOI subarrays responsive to a different set of one or more sensor signals. In a first example, the method further includes, while the guidance system is mounted to the optical instrument, responsive to operator input received at the guidance system, switching from a first operating mode to a second operating mode. In a second example, optionally including the first example, the method further includes, while the guidance system is mounted to the optical instrument, stopping modulation of each of the plurality of EOI subarrays of the first operating mode prior to switching to the second operating mode. In a third example, optionally including one or both of the first and second examples, the method further includes, while the guidance system is mounted to the optical instrument, storing operating data from the first operating mode prior to switching to the second operating mode. In a fourth example, optionally including one or more of the first through third examples, the method further includes, while the guidance system is mounted to the optical instrument, while executing each of the plurality of operating modes, storing performance data at the guidance system, a portable electronic device in wireless communication with the guidance system, and a cloud storage system wirelessly accessible by the portable electronic device. In a fifth example, optionally including one or more of the first through fourth examples, the method further includes, while the guidance system is mounted to the optical instrument, while executing each of the plurality of operating modes, retrieving performance data from the guidance system, the portable electronic device in wireless communication with the guidance system, and the cloud storage system wirelessly accessible by the portable electronic device. In a sixth example, optionally including one or more of the first through fifth examples, the method further includes, while the guidance system is mounted to the optical instrument, while executing each of the plurality of operating modes, displaying the retrieved performance data at operator interfaces of the guidance system and the portable electronic device. In a seventh example, optionally including one or more of the first through examples, the method further includes, while the guidance system is mounted to the optical instrument, executing the plurality of operating modes includes executing a plurality of competitive shooting modes, and wherein the optical instrument comprises a firearm scope.

The technical effect of the guidance system for an optical instrument includes flexibly executing and switching between a plurality of different operating modes while the guidance system is mounted to the same optical instrument. Furthermore, performance data for each of the plurality of operating modes maybe stored, retrieved, and displayed at the guidance system while the guidance system is mounted to the optical instrument. Further still, each of the plurality of operating modes may be executed without detaching the guidance system from the optical instrument. Further still, while executing each of the plurality of operating modes, the guidance system is only peripherally visible to the operator while looking through the eyepiece of the optical instrument and the guidance system is operated without obstructing a field of view of the eyepiece.

Note that the example routines included herein can be used with various optical instruments and/or guidance system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of the method steps is not necessarily required to achieve the features and advantages of the example embodiments described herein, but is provided for ease of illustration and description. One or more of the illustrated actions, operations and/or functions may be repeatedly performed depending on the particular strategy being used.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A guidance system mountable to an optical instrument, the guidance system comprising:
an electronic output indicator (EOI) array, the EOI array positioned at a perimeter of an eyepiece of the optical instrument upon mounting the guidance system to the optical instrument, and
a controller, wherein, while the guidance system is mounted to the optical instrument, the controller includes executable instructions stored in non-transitory memory thereon to:
execute a plurality of operating modes, including, for each operating mode:
obtaining configurable parameter values corresponding to the operating mode, wherein there are configurable parameters that are different for different operating modes;
dividing the EOI array into a different plurality of EOI subarrays, and
modulating each of the plurality of EOI subarrays responsive to a different set of one or more sensor signals.

2. The guidance system of claim 1, wherein, while the guidance system is mounted to the optical instrument, the executable instructions further include, switching between different operating modes, and wherein modulating each of the plurality of EOI subarrays further includes modulating each of the plurality of EOI subarrays responsive to an elapsed time relative to an event initiated by operator input.

3. The guidance system of claim 2, wherein while the guidance system is mounted to the optical instrument, the executable instructions to switch between the different operating modes is in response to operator input received at the guidance system.

4. The guidance system of claim 1, wherein the optical instrument includes a scope for a firearm, and the plurality of operating modes includes two or more different competitive shooting modes, a target spotting mode, a Precision Rifle Shooting (PRS) mode, and a National Rifle League (NRL) Hunter mode.

5. The guidance system of claim 4, wherein during operation of the target spotting mode, the guidance system is in wireless communication with another guidance system, the other guidance system being identical to the guidance system, except for the other guidance system being mountable to a different optical instrument.

6. The guidance system of claim 5, wherein while the guidance system is mounted to the optical instrument, the controller is in wireless communication with a portable electronic device and the controller further includes executable instructions stored in non-transitory memory on board the portable electronic device to, transmit the one or more sensor signals from the portable electronic device to the controller.

7. The guidance system of claim 6, wherein, while the guidance system is mounted to the optical instrument, the portable electronic device includes an internet connection, and the one or more sensor signals are received at the portable electronic device by way of the internet connection.

8. A method of operating a guidance system mountable to an optical instrument, the method comprising:
positioning an electronic output indicator (EOI) array at a perimeter of an eyepiece of the optical instrument upon mounting the guidance system to the optical instrument, wherein,
while the guidance system is mounted to the optical instrument,
executing a plurality of operating modes, including, for each operating mode:
obtaining configurable parameter values corresponding to the operating mode, wherein there are configurable parameters that are different for different operating modes,
dividing the EOI array into a different plurality of EOI subarrays, and
modulating each of the plurality of EOI subarrays responsive to a different set of one or more sensor signals.

9. The method of claim 8, further comprising, while the guidance system is mounted to the optical instrument, responsive to operator input received at the guidance system, switching from a first operating mode to a second operating mode, wherein the configurable parameters modify how the controller modulates EOI states of each of the subarrays of EOIs.

10. The method of claim 9, further comprising, while the guidance system is mounted to the optical instrument, stopping modulation of each of the plurality of EOI subarrays of the first operating mode prior to switching to the second operating mode.

11. The method of claim 10, further comprising, while the guidance system is mounted to the optical instrument, storing operating data from the first operating mode prior to switching to the second operating mode.

12. The method of claim 8, further comprising, while the guidance system is mounted to the optical instrument, while executing each of the plurality of operating modes, storing performance data at the guidance system, a portable electronic device in wireless communication with the guidance system, and a cloud storage system wirelessly accessible by the portable electronic device.

13. The method of claim 12, further comprising, while the guidance system is mounted to the optical instrument, while executing each of the plurality of operating modes, retrieving performance data from the guidance system, the portable electronic device in wireless communication with the guidance system, and the cloud storage system wirelessly accessible by the portable electronic device.

14. The method of claim 13, further comprising, while the guidance system is mounted to the optical instrument, while executing each of the plurality of operating modes, displaying the retrieved performance data at operator interfaces of the guidance system and the portable electronic device.

15. The method of claim 8, wherein, while the guidance system is mounted to the optical instrument, executing the plurality of operating modes includes executing a plurality of competitive shooting modes, and wherein the optical instrument comprises a firearm scope.

16. A guidance system for an optical instrument, comprising:
   a housing mountable to the optical instrument,
   an array of electronic output indicators (EOIs),
   one or more sensors, and
   a controller, wherein
      mounting the housing to the optical instrument positions each of the array of EOIs at a perimeter of an eyepiece of the optical instrument, and
      while each of the array of EOIs are positioned at the perimeter of the eyepiece, the controller includes executable instructions stored in non-transitory memory thereon to:
         execute a plurality of operating modes, including, for each operating mode:
            obtaining configurable parameter values corresponding to the operating mode, each operating mode having a different set of configurable parameters,
            dividing the array of EOIs into a different plurality of EOI subarrays, and
            modulating each of the plurality of EOI subarrays responsive to a different set of signals from the one or more sensors, including modifying how the controller modulates EOI states of each of the subarrays of EOIs by defining one or more of threshold values, ranges, durations, and blink frequencies associated with modulation of the subarrays of EOIs.

17. The guidance system of claim 16, wherein, while each of the array of EOIs are positioned at the perimeter of the eyepiece, each of the array of EOIs are positioned at the perimeter of the eyepiece without obstructing a field of view of the eyepiece.

18. The guidance system of claim 17, wherein, while each of the array of EOIs are positioned at the perimeter of the eyepiece, each of the array of EOIs are only peripherally visible while viewing the field of view through the eyepiece.

19. The guidance system of claim 16, wherein the one or more sensors includes an inertial measurement unit (IMU) sensor, and wherein controller modulates EOI states of each of the subarrays of EOIs by defining threshold values, ranges, durations, and blink frequencies associated with modulation of the subarrays of EOIs.

20. The guidance system of claim 16, wherein, while each of the array of EOIs are positioned at the perimeter of the eyepiece, the executable instructions to switch from one to a different of the plurality of operating modes is in response to operator input received at a portable electronic device in wireless communication with the controller.

* * * * *